(12) United States Patent
Nishikawa et al.

(10) Patent No.: US 10,008,773 B2
(45) Date of Patent: Jun. 26, 2018

(54) WIRELESS COMMUNICATION APPARATUS, ANTENNA DIRECTIONALITY CONTROL METHOD, AND POWER SUPPLY CIRCUIT

(71) Applicant: FUJITSU LIMITED, Kawasaki-shi, Kanagawa (JP)

(72) Inventors: Kenichi Nishikawa, Kawasaki (JP); Kazuyuki Ozaki, Yokohama (JP); Masahiko Shimizu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/597,101

(22) Filed: May 16, 2017

(65) Prior Publication Data
US 2017/0346184 A1 Nov. 30, 2017

(30) Foreign Application Priority Data

May 25, 2016 (JP) .................................. 2016-104076

(51) Int. Cl.
*H01Q 3/38* (2006.01)
*H01Q 1/24* (2006.01)
(Continued)

(52) U.S. Cl.
CPC ............... *H01Q 3/38* (2013.01); *H01Q 1/246* (2013.01); *H04W 16/28* (2013.01); *H04W 52/0206* (2013.01); *H04W 88/085* (2013.01)

(58) Field of Classification Search
CPC .......... H01Q 3/38; H01Q 1/246; H01Q 21/06; H01Q 3/30; H01Q 3/36; H01Q 3/40; H04W 16/28; H04W 52/0206; H04W 88/085
See application file for complete search history.

(56) References Cited

U.S. PATENT DOCUMENTS

| 4,652,880 A | 3/1987 | Moeller et al. |
| 9,397,713 B1 * | 7/2016 | Kirkpatrick .......... H04B 1/0475 |

(Continued)

FOREIGN PATENT DOCUMENTS

| JP | 60-264104 | 12/1985 |
| JP | 01-129508 | 5/1989 |

(Continued)

*Primary Examiner* — Janice Tieu
(74) *Attorney, Agent, or Firm* — Fujitsu Patent Center

(57) ABSTRACT

A wireless communication apparatus includes a plurality of phase adjusters configured to adjust the phase of a digital baseband signal $d^{(k)}$ for k=1, 2, ..., K (K is a natural number equal to or larger than one) and output a plurality of digital signals $d_1^{(k)}$, $d_2^{(k)}$, $d_m^{(k)}$ (m is a natural number equal to or larger than two) having phases different from each other, an i-th converter configured to convert a signal obtained by synthesizing the digital signals $d_i^{(1)}$, $d_i^{(2)}$, ..., $d_i^{(K)}$ into an analog signal $a_i$ for i=1, 2, ..., m, and a power supply circuit including a first stage circuit, a second stage circuit, ..., an N-th stage circuit (N is a natural number equal to or larger than one).

10 Claims, 23 Drawing Sheets

(51) Int. Cl.
*H04W 16/28* (2009.01)
*H04W 52/02* (2009.01)
*H04W 88/08* (2009.01)

(56) References Cited

U.S. PATENT DOCUMENTS

2007/0080886 A1   4/2007  Thomas et al.
2009/0227273 A1*  9/2009  McCune, Jr. ........... H04W 8/30
                                                     455/466
2009/0290631 A1* 11/2009  Lee ........................ H04B 1/662
                                                     375/240

FOREIGN PATENT DOCUMENTS

JP       08-181540      7/1996
JP       2007-511124    4/2007

* cited by examiner

WIRELESS COMMUNICATION APPARATUS, ANTENNA DIRECTIONALITY CONTROL METHOD, AND POWER SUPPLY CIRCUIT

CROSS-REFERENCE TO RELATED APPLICATION

This application is based upon and claims the benefit of priority of the prior Japanese Patent Application No. 2016-104076, filed on May 25, 2016, the entire contents of which are incorporated herein by reference.

FIELD

The embodiments discussed herein are related to a wireless communication apparatus, an antenna directionality control method, and a power supply circuit.

BACKGROUND

Examples of a method of improving the SN ratio (signal to noise ratio) of wireless communication include beam forming in which the energy of a radio signal is concentrated in a direction of a beam by using an array antenna. Among various methods of performing beam forming by using array antennas, a method of inputting digital information multiplied with a weight to a DAC attached to each antenna element allows each antenna element to be freely operated and provides favorable performance. DAC is abbreviation for digital to analog convertor. However, a DAC consumes a large amount of power, and thus use of the same number of DACs as the number of antenna elements increases power consumption.

Hybrid beam forming is known as a method of performing beam forming with a reduced number of DACs. When the hybrid beam forming is applied, an array antenna including a plurality of subarrays is used, and one DAC is used for each subarray. Each antenna element of the array antenna is provided with a phase controller (phase shifter), and the direction of a beam is controlled by controlling the phase of a radio signal through phase control by a baseband unit and phase control by the phase controller.

As examples of the related art, Japanese Laid-open Patent Publication Nos. 60-264104, 1-129508, and 8-181540 and Japanese National Publication of International Patent Application No. 2007-511124.

SUMMARY

According to an aspect of the invention, a wireless communication apparatus includes a plurality of phase adjusters configured to adjust the phase of a digital baseband signal $d^{(k)}$ for k=1, 2, . . . ,K (K is a natural number equal to or larger than one) and output a plurality of digital signals $d_1^{(k)}, d_2^{(k)}, \ldots, d_m^{(k)}$ (m is a natural number equal to or larger than two) having phases different from each other, an i-th converter configured to convert a signal obtained by synthesizing the digital signals $d_i^{(1)}, d_i^{(2)}, \ldots, d_i^{(K)}$ into an analog signal $a_i$ for i=1, 2, . . . ,m, and a power supply circuit including a first stage circuit, a second stage circuit, . . . , an N-th stage circuit (N is a natural number equal to or larger than one), wherein the first stage circuit outputs an analog signal having a phase same as the phase of the analog signal $a_1$, an analog signal having a phase same as the phase of an analog signal obtained by inputting the analog signal $a_{i-1}$ and the analog signal $a_i$ to a combiner for i=2, 3, . . . ,m, and an analog signal having a phase same as the phase of the analog signal $a_m$, the (n+1)-th stage circuit outputs an analog signal having a phase same as the phase of an analog signal $a_1^{(n)}$, an analog signal having a phase same as the phase of an analog signal obtained by inputting an analog signal $a_{i-1}^{(n)}$ and an analog signal $a_i^{(n)}$ to a combiner for i=2, 3, . . . ,m, and an analog signal having a phase same as the phase of an analog signal $a_M^{(n)}$, where analog signals outputted from the n-th stage circuit are represented by $a_1^{(n)}, a_2^{(n)}, \ldots, a_M^{(n)}$ (M is a natural number equal to or larger than three), and the N-th stage circuits output analog signals to different antenna elements, respectively.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When hybrid beam forming is applied, the number of beams is restricted by the number of DACs. Thus, increase in the number of DACs is desired so as to increase the number of beams when the hybrid beam forming is applied, which leads to increase in power consumption.

It is an objective of the following disclosure to allow a beam to point to a plurality of directions while reducing increase in the number of DACs.

Embodiments will be described below with reference to the accompanying drawings. However, the embodiments described below are merely exemplary and not intended to exclude various kinds of modifications and technical applications not obviously described below. In drawings referred to in the embodiments described below, any components denoted by an identical reference sign are identical or equivalent components unless otherwise mentioned. When a plurality of identical or equivalent components are included in one drawing, #r (r is a natural number) is attached to, for example, a reference sign in some cases to distinguish those components.

(Embodiment 1)

Figure 1:
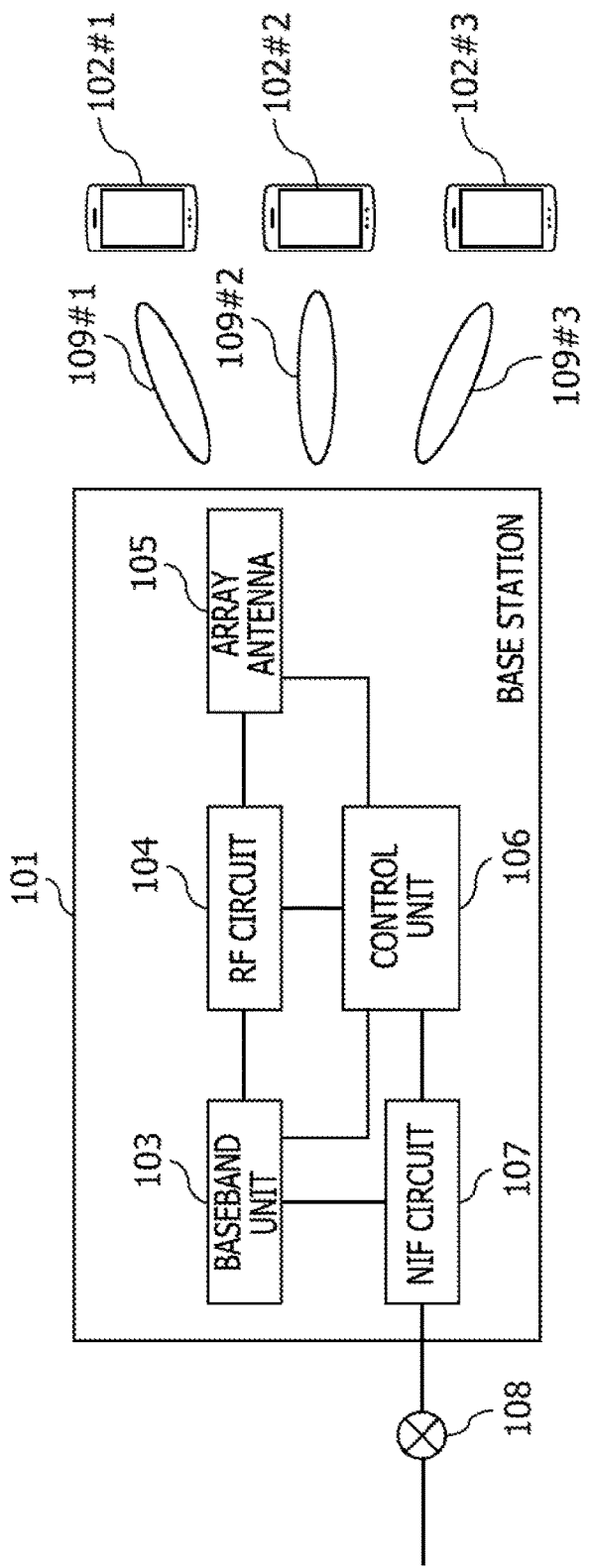
FIG. 1 is a functional block diagram of a base station according to Embodiment 1.

FIG. 1 is a functional block diagram of a base station 101 according to Embodiment 1. The base station 101 is an exemplary wireless communication apparatus.

The base station 101 includes a baseband unit 103, a radio frequency (RF) circuit 104, an array antenna 105, a control unit 106, and a network interface (NIF) circuit 107.

The NIF circuit 107 is configured to function as an interface of the baseband unit 103 and the control unit 106 to a network 108. The network 108 connects the base station 101 with a host network or another base station 101.

The baseband unit 103 processes a baseband signal. For example, when having received control data or user data from the network 108 through the NIF circuit 107, the baseband unit 103 generates a baseband signal corresponding to the control data or the user data. When having received a baseband signal from the RF circuit 104, the baseband unit 103 generates control data or user data to be transmitted to the network 108.

When having received a baseband signal from the baseband unit 103, the RF circuit 104 converts the baseband signal into a radio signal and outputs the radio signal to the array antenna 105. When having received a radio signal from the array antenna 105, the RF circuit 104 converts the radio signal into a baseband signal and outputs the baseband signal to the baseband unit 103.

The array antenna 105 includes a plurality of antenna elements. When the array antenna 105 includes, for example, a plurality of phase shifters, the phases of radio signals inputted to the antenna elements are controlled to form beams, and the radio signals are transmitted in directions to which the beams point. In the present embodiment, hybrid beam forming is performed by controlling the phase of a digital baseband signal in addition to the control of the phase shifters. This configuration allows beams 109#1 to 109#3 to simultaneously point to a plurality of terminals, for example, wireless terminal apparatuses 102#1 to 102#3, respectively.

The control unit 106 controls each component of the base station 101, such as the NIF circuit 107, the baseband unit 103, the RF circuit 104, or the array antenna 105. For example, the control unit 106 controls data communication with the network 108 by the NIF circuit 107, and controls the phase of a baseband signal generated or received by the baseband unit 103. The control unit 106 also controls outputting of a radio signal by the RF circuit 104, and controls a parameter of a power supply circuit to be described later. The control unit also controls the phase shifters included in the array antenna 105, and controls directions in which beams are formed to point.

Figure 2:
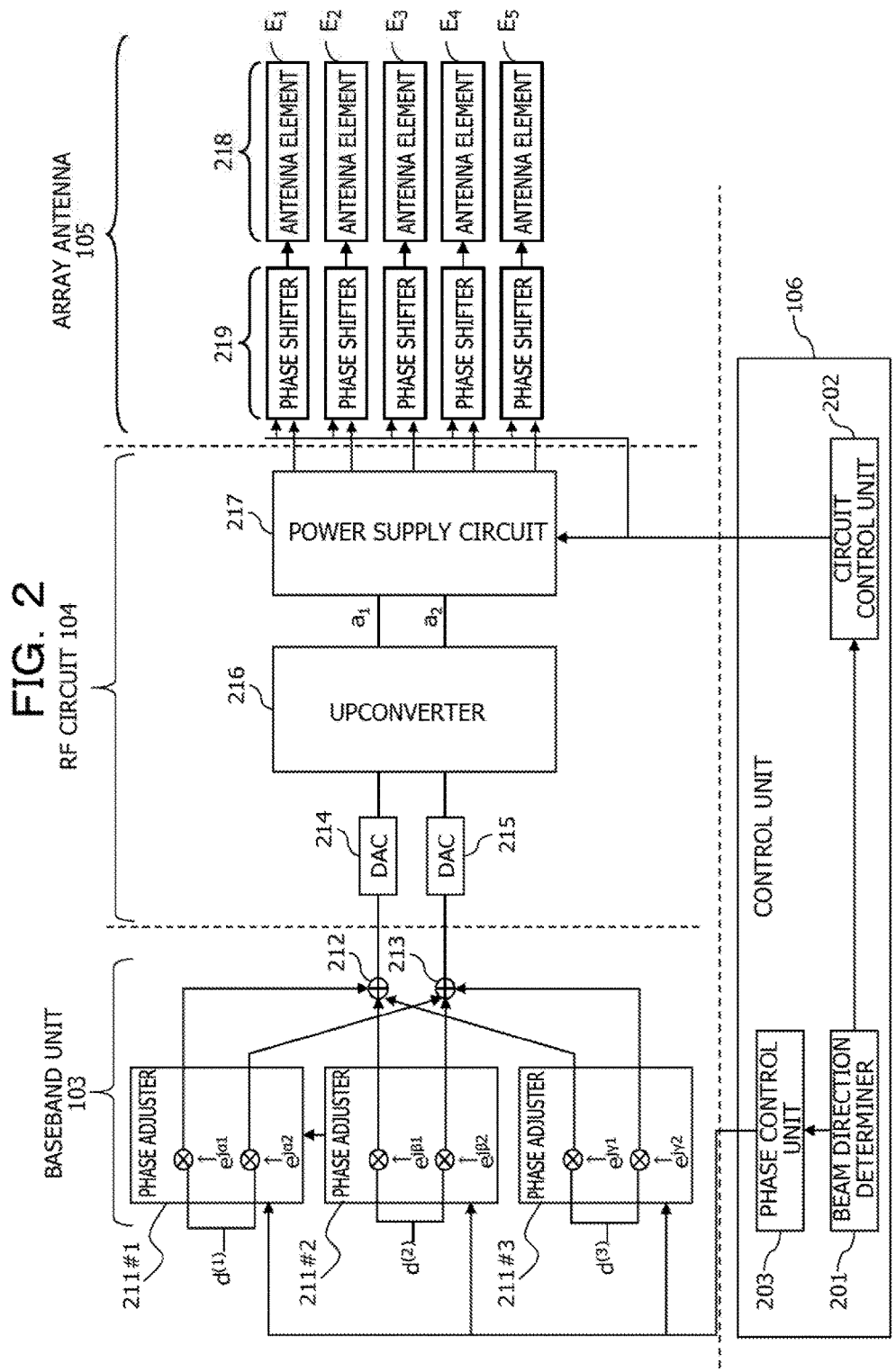
FIG. 2 is a functional block diagram of a baseband unit, an RF circuit, an array antenna, and a control unit of the base station according to Embodiment 1.

FIG. 2 is a more detailed functional block diagram the baseband unit 103, the RF circuit 104, the array antenna 105, and the control unit 106 of the base station 101.

The baseband unit 103 includes phase adjusters 211#1 to 211#3. The phase adjusters 211#1 to 211#3 control the phases of baseband signals (digital baseband signals) $d^{(1)}$ to $d^{(3)}$, respectively, generated as digital signals.

For example, phase adjuster 211#1 multiplies digital baseband signal $d^{(1)}$ with complex values $e^{j\alpha 1}$ and $e^{j\alpha 2}$ (where e is the base of natural logarithm, j is the imaginary unit, and α1 and α2 are real numbers), and outputs digital signals having phases different from each other. Phase adjuster 211#2 multiplies digital baseband signal $d^{(2)}$ with complex values $e^{j\beta 1}$ and $e^{j\beta 2}$ (where β1 and β2 are real numbers), and outputs digital signals having phases different from each other. Phase adjuster 211#3 multiplies digital baseband signal $d^{(3)}$ with complex values $e^{j\gamma 1}$ and $e^{j\gamma 2}$ (where γ1 and γ2 are real numbers), and outputs digital signals having phases different from each other.

Accordingly, the phase adjusters 211#1 to 211#3 output digital signals having different phase progressions. In other words, the phase adjusters 211#1 to 211#3 output a plurality of digital signals each having a retarded or advanced phase progression.

The baseband unit 103 includes digital combiners 212 and 213. The digital combiner 212 synthesizes, through addition, one of the digital signals outputted from each of the phase adjusters 211#1 to 211#3, and outputs the synthesized signal to the RF circuit 104. The digital combiner 213 synthesizes, through addition, the other of the digital signals outputted from each of the phase adjusters 211#1 to 211#3, and outputs the synthesized signal to the RF circuit 104.

The RF circuit 104 includes DACs 214 and 215, an upconverter 216, and a power supply circuit 217.

The DACs 214 and 215 convert the digital signals outputted from the respective digital combiners 212 and 213 into analog signals (analog baseband signals), and output the converted signals to the upconverter 216.

In the above description, the number of digital baseband signals is three, and each digital baseband signal is multiplied with two complex values. However, the number of digital baseband signals may be an optional natural number (referred to as K, for example) equal to or larger than one, and the number of multiplying complex values may be an optional natural number equal to or larger than two.

For example, digital baseband signals $d^{(1)}, d^{(2)}, \ldots, d^{(K)}$ are inputted to respective phase adjusters 211#1 to 211#K. In this case, for k=1, 2,..., K, the phase adjuster 211#i is capable of generating a plurality of digital signals $d_1^{(k)}, d_2^{(k)}, \ldots, d_m^{(k)}$ having phases different from each other by multiplying $d^{(i)}$ with m complex numbers. In this case, $d_1^{(k)}, d_2^{(k)}, \ldots, d_m^{(k)}$ may have sequentially advanced or retarded phase progressions in this order.

For i=1, 2,..., m, $d_i^{(1)}, d_i^{(2)}, \ldots, d_i^{(K)}$ may be inputted to m respective digital combiners #1, #2, ..., #m, synthesized through addition, and inputted to m respective DACs, thereby obtaining m analog signals $a_i'(i=1, 2, \ldots, m)$.

Thus, FIG. 2 illustrates a case with K=3 and m=2.

The upconverter 216 generates analog radio signals $a_1$ and $a_2$ by converting the frequencies of analog signals $a_1'$ and $a_2'$ inputted from the DACs 214 and 215. The functionalities of the DAC 214 and the upconverter 216 configured to convert the frequency of a signal outputted from the DAC 214 are also collectively referred to as a first converter. Similarly, the functionalities of the DAC 215 and the upconverter 216 configured to convert the frequency of a signal outputted from the DAC 215 are also collectively referred to as a second converter.

The power supply circuit 217 outputs analog signals generated from analog radio signals $a_1$ and $a_2$ generated by the upconverter 216 to a plurality of antenna elements 218 of the array antenna 105 through phase shifters 219. In the present embodiment, the power supply circuit 217 outputs radio signals having phases gradually different between the positions of the antenna elements 218 as described below.

For example, it is assumed that digital baseband signals $d_1^{(1)}$ and $d_2^{(1)}$ having a phase difference therebetween are generated by the phase adjuster 211#1 in response to $d^{(1)}$. It is also assumed $d_1^{(1)}$ and $d_2^{(1)}$ are converted into analog signals $a_1^{(1)}$ and $a_2^{(1)}$, respectively, through the processing at the digital combiners 212 and 213, the DACs 214 and 215, and the upconverter 216.

In addition, it is assumed that the power supply circuit 217 supplies signal having a phase same as that of $a_1^{(1)}$ to antenna element $E_1$ among the plurality of antenna elements 218, and supplies signal having a phase same as that of $a_2^{(1)}$ to antenna element $E_s$ (for example, s=5 in the case of FIG. 2). When $E_2, \ldots, E_{s-1}$ represent antenna elements disposed between $E_1$ and $E_s$, the phases of radio signals outputted to $E_2, E_3, \ldots, E_{s-1}$, respectively, by the power supply circuit 217 are phases with which phase between the phases of the radio signals outputted to $E_1$ and $E_s$ is interpolated. The phases of a plurality of radio signals are said to be gradually different when the phases are phases with which phase between the phases of two radio signals is interpolated.

When $E_1, E_2, \ldots, E_s$ are disposed at equal intervals, radio signals having a phase difference of (phase difference between $a_1^{(1)}$ and $a_2^{(1)}$)/(s−1) are outputted to $E_i$ and $E_{i-1}$ adjacent to each other. Such power supply to the antenna elements 218 with radio signals having gradually different phases enables transmission of a radio signal corresponding to $d^{(1)}$ through a beam in a particular direction.

Figure 3:
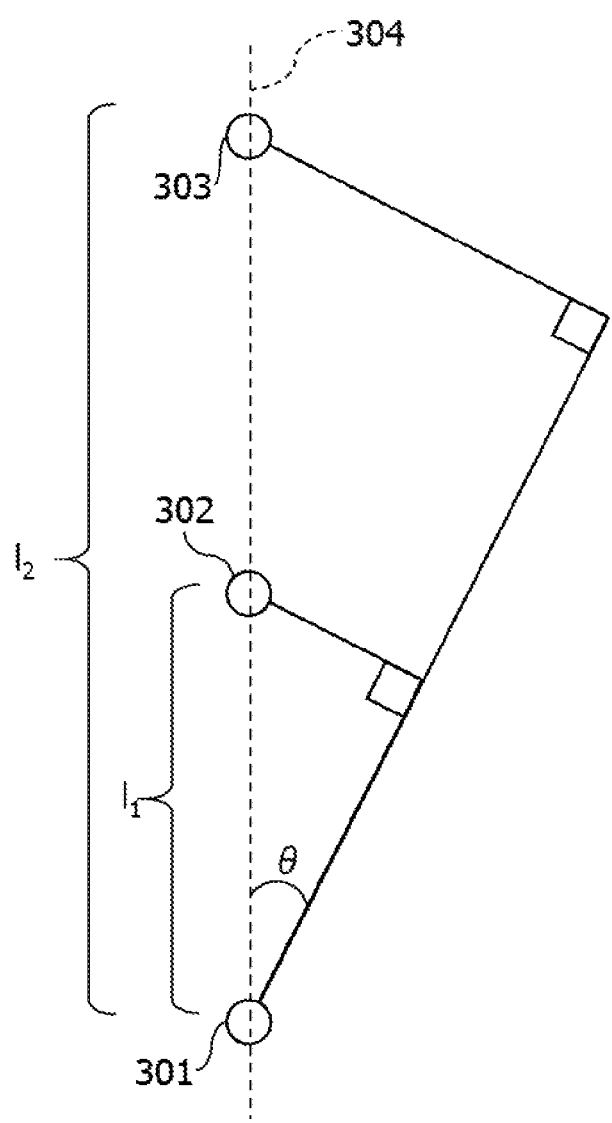
FIG. 3 is a diagram for description that it is possible to transmit a radio signal corresponding to a digital baseband signal in a particular direction by changing the phase of the radio signal.

FIG. 3 is a diagram for description of transmission of a radio signal in a particular direction by changing the phase of the radio signal corresponding to a digital baseband signal. Antenna elements 301, 302, and 303 are arranged on dotted line 304 corresponding to a principal surface of the array antenna 105. The distance between the antenna element 301 and the antenna element 302 is represented by $I_1$, and the distance between the antenna element 301 and the antenna element 303 is represented by $I_2$.

In this case, a radio signal is transmitted in a direction at an angle of θ with respect to dotted line 304 when a radio signal transmitted from the antenna element 302 is advanced by a phase corresponding to a distance of $I_1 \times \sin θ$ with respect to a radio signal transmitted from the antenna element 301 and a radio signal transmitted from the antenna element 303 is advanced by a phase corresponding to a distance of $I_2 \times \sin θ$ with respect to a radio signal transmitted from the antenna element 301. Thus, when $I_2$ is twice as long as $I_1$, a phase difference between radio signals transmitted from the antenna element 301 and the antenna element 302 is equal to a phase difference between radio signals transmitted from the antenna element 302 and the antenna element 303.

When $I_2$ is not twice as long as $I_1$, phase progression of a radio signal transmitted from the antenna element 302 is set to be of phase progression of a radio signal transmitted from the antenna element 303.

In this manner, a beam is formed in a particular direction by supplying radio signals having gradually different phases to the antenna elements 301, 302, and 303.

The following description will be made with reference to FIG. 2. The control unit 106 includes a beam direction determiner 201, a circuit control unit 202, and a phase control unit 203.

The beam direction determiner 201 determines a direction in which a beam from the principal surface of the array antenna 105 is formed. This determination is achieved by estimating a direction toward each of wireless terminal apparatuses 102#1 to 102#3 from the array antenna 105 by using, for example, information related to a precoding matrix transmitted from the wireless terminal apparatus. For example, the direction toward which a beam from the principal surface of the array antenna 105 is formed is determined to be a direction averaged over directions toward wireless terminal apparatuses 102#1 to 102#3.

The circuit control unit 202 controls parameters of the power supply circuit 217 and the array antenna 105 based on the determination by the beam direction determiner 201. The array antenna 105 includes the phase shifters 219 corresponding to the respective antenna elements 218 ($E_1$ to $E_5$), and includes a parameter related to phase control by the phase shifters 219. When including an amplifier as described later, the power supply circuit 217 includes a parameter related to the gain of the amplifier in some cases. The circuit control unit 202 adjusts these parameters to control the direction of a beam formed by the array antenna.

The phase control unit 203 determines complex values with which the phase adjusters 211#1 to 211#3 multiply digital baseband signals $d^{(1)}$ to $d^{(3)}$, respectively, based on the determination by the beam direction determiner 201. In this manner, the direction of a beam formed by the array antenna is allowed to point to each wireless terminal apparatuses 102#1 to 102#3 or point to null.

Digital signals obtained by adjusting the phases of baseband digital signals $d^{(1)}$ to $d^{(3)}$ and synthesizing the baseband digital signals are outputted from the baseband unit 103 to the RF circuit 104. Thus, the number of signals inputted from the baseband unit 103 to the RF circuit 104 is equal to the number of (in the case of FIG. 2, two) digital signals outputted from each of the phase adjusters 211#1 to 211#3 and having a phase difference therebetween. Accordingly, the number of signals outputted from the baseband unit 103 to the RF circuit 104 does not depend on the number of baseband digital signals $d^{(1)}$ to $d^{(3)}$ (three, in the case of FIG. 2).

Figure 4:
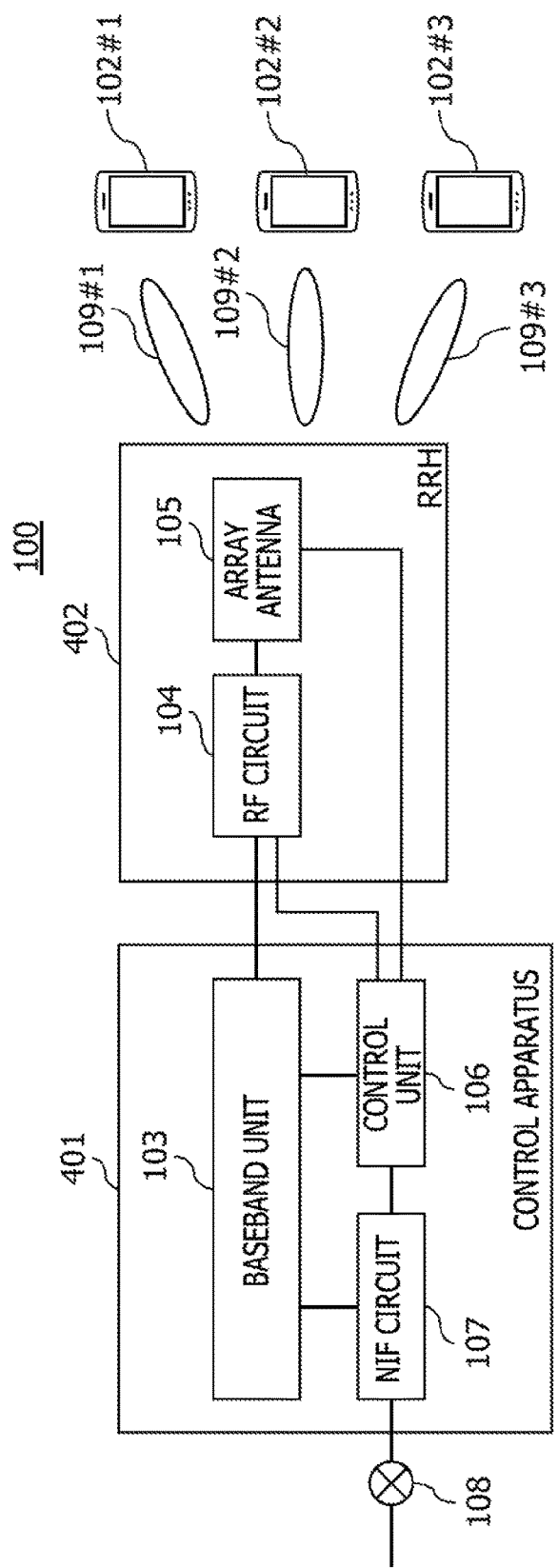
FIG. 4 is a functional block diagram illustrating that the base station is according to Embodiment 1 divided into a control apparatus and an RRH.

Thus, when the configuration of the base station 101 is divided into a control apparatus 401 and a RRH 402 as illustrated in FIG. 4, the number of signal lines between the control apparatus 401 and the RRH 402 does not depend on the number of baseband digital signals $d^{(1)}$ to $d^{(3)}$. This configuration is capable of avoiding increase (crunch) in the amount of communication between the control apparatus 401 and the RRH 402 due to increase in the number of users.

RRH is abbreviation for remote radio head. The control apparatus 401 includes the baseband unit 103, the control unit 106, and the NIF circuit 107, and the RRH 402 includes the RF circuit 104 and the array antenna 105. Signal lines between the control apparatus 401 and the RRH 402 in FIG. 4 include a signal line through which digital signals obtained by synthesizing baseband digital signals $d^{(1)}$ to $d^{(3)}$ are transferred, and signal lines through which information on control of the RF circuit 104 and the array antenna 105 by the control unit 106 is transferred.

Figure 5:
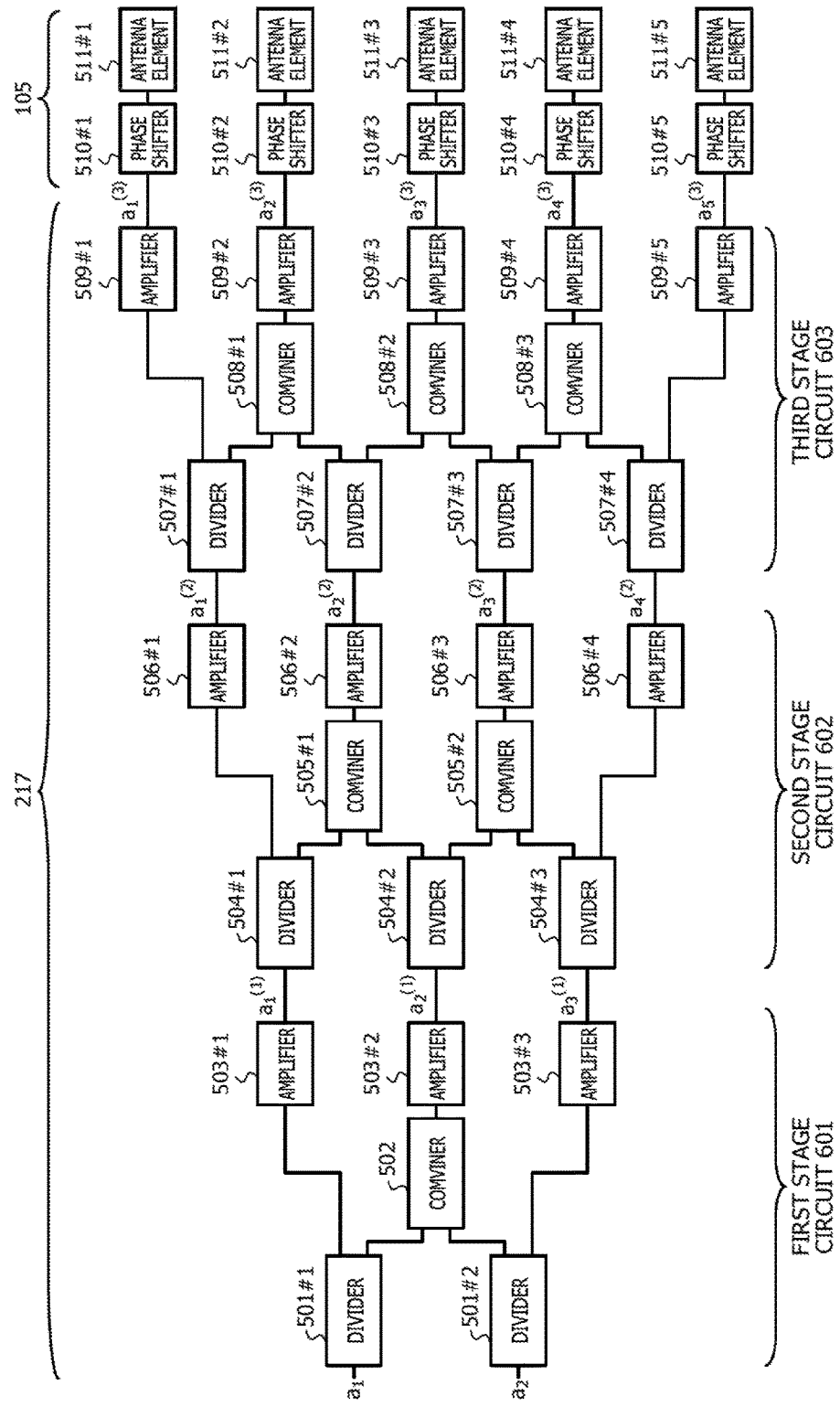
FIG. 5 is a diagram illustrating the configuration of a power supply circuit and a connection relation between the power supply circuit and the array antenna at the base station according to Embodiment 1.

The following describes a circuit configuration of the power supply circuit 217 and connection between the power supply circuit 217 and the array antenna 105. FIG. 5 is a diagram illustrating an exemplary circuit configuration of the power supply circuit 217 and exemplary connection between the power supply circuit 217 and the array antenna 105. As illustrated in FIG. 5, the power supply circuit 217 has a three-stage configuration including a first stage circuit 601, a second stage circuit 602, and a third stage circuit 603.

When output signals (analog signals) from the DACs 214 and 215 (refer to FIG. 2) are represented by $a_1$ and $a_2$, respectively, $a_1$ and $a_2$ are inputted to dividers 501#1 and 501#2 of the first stage circuit, respectively. The dividers 501#1 and 501#2 distribute the input analog signals into a plurality of analog signals. In FIG. 5, the analog signals inputted to the dividers 501#1 and 501#2 are each distributed into two.

The dividers 501#1 and 501#2 perform equal distribution, output signals from each of the dividers 501#1 and 501#2 have identical amplitudes and phases. Alternatively, the dividers 501#1 and 501#2 may output a plurality of output signals having different amplitudes but identical phases based on a parameter of, for example, weighting. This also applies to other dividers to be described later.

One of output signals from the divider 501#1 is inputted to an amplifier 503#1. The other of the output signals from the divider 501#1 and One of output signals from the divider 501#2 are inputted to a combiner 502, at which analog signal synthesis is performed, and a result of the synthesis is inputted to amplifier 503#2. The other of the output signals from the divider 501#2 is inputted to an amplifier 503#3.

Input signals to the combiner 502 may have identical fractions of an output signal from the combiner 502. For example, when the other of the output signals from the divider 501#1 is represented by $a_{501\#1}$, and One of output signals from the divider 501#2 is represented by $a_{501\#2}$, the combiner 502 may output $a_{501\#1}+a_{501\#2}$. Alternatively, the combiner 502 may synthesize the input signals based on a parameter of, for example, weighting, so that the input signals have different fractions in an output signal. For example, the input signals may be synthesized and output so that synthesis fractions of 2:3 are obtained as in $(2/5) \times a_{501\#1} + (3/5) \times a_{501\#2}$. Other synthesis fractions are applicable.

The amplifiers 503#1 to 503#3 each amplify or attenuate an input analog signal, and input the analog signal to the second stage circuit 602. The amplifiers 503#1 to 503#3 each may have a variable gain (amplification rate or attenuation rate) depending on a parameter. The amplifiers 503#1 to 503#3 each may have unity gain. When any of the amplifiers 503#1 to 503#3 has unity gain, this amplifier may be omitted. This also applies to amplifiers to be described later.

The magnitudes (for example, maximum amplitudes) of the output signals from the amplifiers 503#1 to 503#3 may be equal to each other. This equalization of the magnitudes of output signals is also referred to as normalization of output signals in some cases.

The amplifier 503#2 connected with an output side of the combiner 502 may be replaced with two amplifiers connected with an input side of the combiner 502. However, since the combiner 502 includes two inputs, connecting amplifiers with the input side of the combiner 502 results in increase of the number of amplifiers, and thus it is preferable that an amplifier is connected with the output side of the combiner 502.

When output signals from the amplifiers 503#1 to 503#3 are represented by $a_1^{(1)}$ to $a_3^{(1)}$, respectively, the phases of $a_1^{(1)}$ and $a_3^{(1)}$ are same as the phases of $a_1$ and $a_2$ because the amplifiers 503#1 to 503#3 do not change the phases of the signals. The phase of $a_2^{(1)}$ is same as the phase of a signal inputted to the amplifier 503#2 (output signal from the combiner 502), and thus is a phase at the middle of the phases of $a_1$ and $a_2$ as described later with reference to FIG. 7. Thus, $a_1^{(1)}$ to $a_3^{(1)}$ are signals having gradually different phases. In other words, $a_1^{(1)}$ to $a_3^{(1)}$ are signals having sequentially advanced or retarded phase progression.

The signals $a_1^{(1)}$ to $a_3^{(1)}$ are inputted to dividers 504#1 to 504#3 of the second stage circuit 602, respectively. The analog signals inputted to the dividers 504#1 to 504#3 are each distributed into two.

One of output signals from the divider 504#1 is inputted to an amplifier 506#1. The other of the output signals from the divider 504#1 and One of output signals from the divider 504#2 are inputted to a combiner 505#1, at which analog signal synthesis is performed, and a result of the synthesis is inputted to an amplifier 506#2. The other of the output signals from the divider 504#2 and One of output signals from the divider 504#3 are inputted to a combiner 505#2, at which analog signal synthesis is performed, and a result of the synthesis is inputted to an amplifier 506#3. The other of the output signals from the divider 504#3 is inputted to an amplifier 506#4.

The amplifiers 506#1 to 506#4 each amplify or attenuate an input analog signal, and output the analog signal to the third stage circuit 603.

When output signals from the amplifiers 506#1 to 506#4 are represented by $a_1^{(2)}$ to $a_4^{(2)}$, respectively, the phases of $a_1^{(2)}$ and $a_4^{(2)}$ are same as the phases of $a_1^{(1)}$ and $a_3^{(1)}$, and thus same as the phases of $a_1$ and $a_2$. The phase of $a_2^{(2)}$ is a phase at the middle of the phases of $a_1^{(1)}$ and $a_2^{(1)}$, and the phase of $a_3^{(2)}$ is a phase at the middle of the phases of $a_2^{(1)}$ and $a_3^{(1)}$. Thus, $a_1^{(2)}$ to $a_4^{(2)}$ are signals having gradually different phases. In other words, $a_1^{(2)}$ to $a_4^{(2)}$ are signals having advanced or retarded phases in this order.

The signals $a_1^{(2)}$ to $a_4^{(2)}$ are inputted to dividers 507#1 to 507#4 of the third stage circuit 603, respectively. The analog signals inputted to the dividers 507#1 to 507#4 are each distributed into two.

One of output signals from the divider 507#1 is inputted to an amplifier 509#1. The other of the output signals from the divider 507#1 and One of output signals from the divider 507#2 are inputted to a combiner 508#1, at which analog signal synthesis is performed, and a result of the synthesis is inputted to an amplifier 509#2.

The other of the output signals from the divider 507#2 and One of output signals from the divider 507#3 are inputted to a combiner 508#2, at which analog signal synthesis is performed, and a result of the synthesis is inputted to an amplifier 509#3. The other of the output signals from the divider 507#3 and One of output signals from the divider 507#4 are inputted to a combiner 508#3, at which analog signal synthesis is performed, and a result of the synthesis is inputted to an amplifier 509#4. The other of the output signals from the divider 507#4 is inputted to an amplifier 509#5.

When output signals from the amplifiers 509#1 to 509#5 are represented by $a_1^{(3)}$ to $a_5^{(3)}$, respectively, the phases of $a_1^{(3)}$ and $a_5^{(3)}$ are same as the phases of $a_1^{(2)}$ and $a_4^{(2)}$, and thus same as the phases of $a_1$ and $a_2$. The phase of $a_2^{(3)}$ is a phase at the middle of the phases of $a_1^{(2)}$ and $a_2^{(2)}$, the phase of $a_3^{(3)}$ is a phase at the middle of the phases of $a_2^{(2)}$ and $a_3^{(2)}$, and the phase of $a_4^{(3)}$ is a phase at the middle of the phases of $a_3^{(2)}$ and $a_4^{(2)}$. Thus, $a_1^{(3)}$ to $a_5^{(3)}$ are signals having gradually different phases. In other words, $a_1^{(3)}$ to $a_5^{(3)}$ are signals having sequentially advanced or retarded phase progression.

Output signals $a_1^{(3)}$ to $a_5^{(3)}$ are inputted to phase shifters 510#1 to 510#5, respectively, at which phase progression thereof is controlled. Output signals from the phase shifters 510#1 to 510#5 are inputted to antenna elements 511#1 to 511#5, respectively.

Since $a_1^{(3)}$ to $a_5^{(3)}$ have gradually different phases as described above, analog signals inputted to the antenna elements 511#1 to 511#5 have gradually different phases. In other words, since $a_1^{(3)}$ to $a_5^{(3)}$ are signals having sequentially advanced or retarded phase progression, the antenna elements 511#1 to 511#5 receive signals having sequentially advanced or retarded phase progression.

Figure 6:
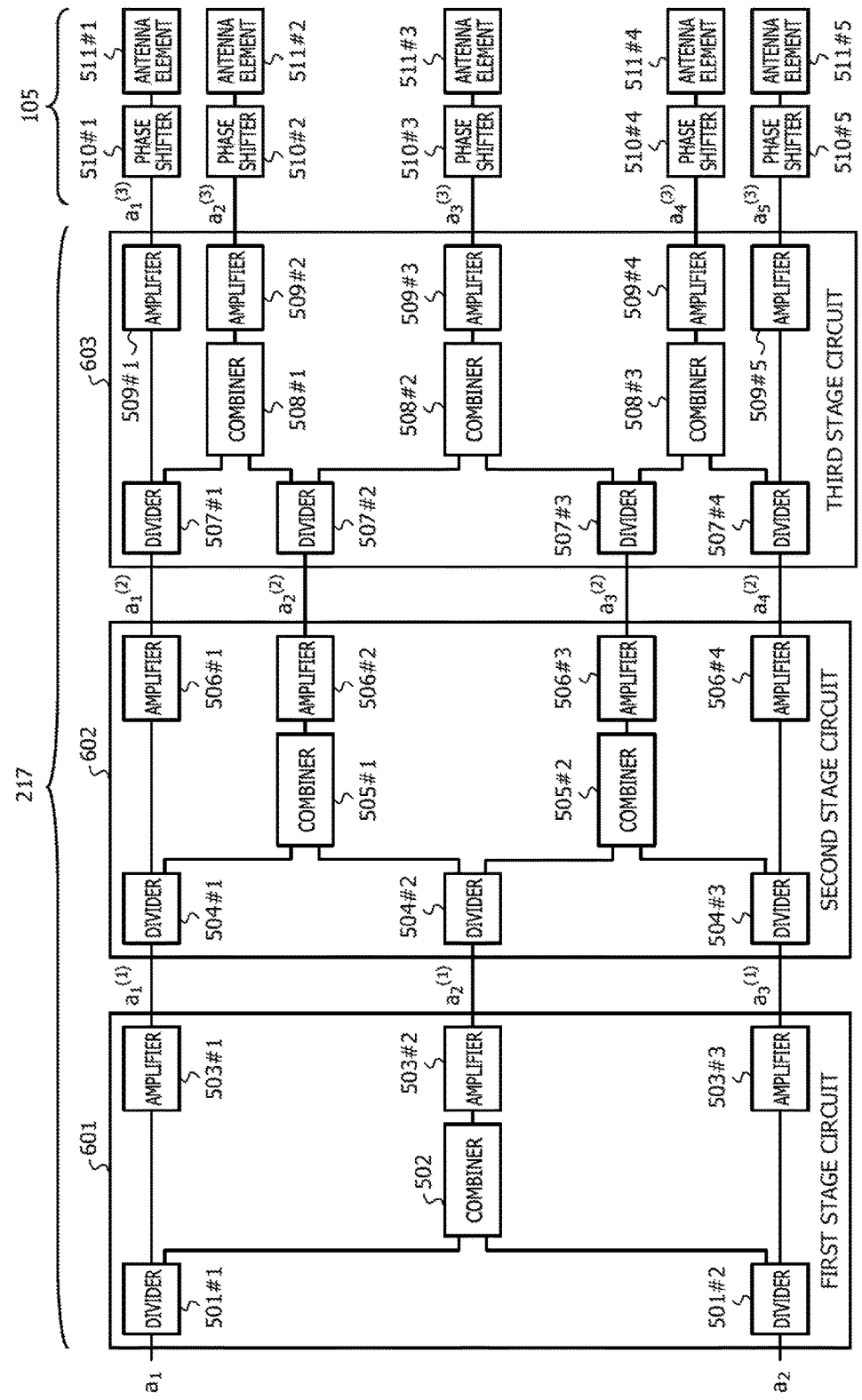
FIG. 6 is a diagram illustrating the configuration of the power supply circuit and the connection relation between the power supply circuit and the array antenna at the base station according to Embodiment 1.

FIG. 6 illustrates the configuration of the power supply circuit 217 illustrated in FIG. 5 to more clearly describe change and difference between phases. In FIG. 6, phase differences between input signals to dividers, input signals to amplifiers, and output signals from combiners are represented by relations between the vertical positions of the dividers, the amplifiers, and the combiners in FIG. 6. In other words, when the vertical positions of input signals to dividers, the vertical positions of input signals to amplifiers, or the vertical positions of output signals from combiners are substantially the same, the input signals to the dividers, the input signals to the amplifiers, or the output signals from the combiner have the same phase. When the vertical positions of input signals to dividers, the vertical positions of input signals to amplifiers, or the vertical positions of output signals from combiners are effectively different from each other, the input signals to the dividers, the input signals to the amplifiers, or the output signals from the combiners have different phases.

Accordingly, in the first stage circuit 601, the dividers 501#1 and 501#2, to which $a_1$ and $a_2$ are respectively inputted, are disposed at upper and lower positions in FIG. 6. The amplifiers 503#1 and 503#3, to each of which one of output signals from the dividers 501#1 and 501#2 is inputted, are disposed at an upper position and a lower position in FIG. 6. This indicates that output signals from the dividers 501#1 and 501#2 have phases same as the phases of $a_1$ and $a_2$, respectively.

The phase of an output signal from the combiner 502, to which the other of the output signals from the divider 501#1 and One of output signals from the divider 501#2 are inputted is at the middle of the phases of $a_1$ and $a_2$. Accordingly, the combiner 502 is disposed substantially at the middle in the vertical direction in FIG. 6, and thus the amplifier 503#2 is disposed substantially at the middle in the vertical direction in FIG. 6.

Similarly, in the second stage circuit 602, the dividers 504#1 and 504#3 are disposed at upper and lower positions in FIG. 6, respectively, and the divider 504#2 is disposed substantially at the middle in the vertical direction in FIG. 6. In other words, the dividers 504#1, 504#2, and 504#3 are arranged in this order from top to bottom in FIG. 6.

The amplifiers 506#1 and 506#4, to each of which one of output signals from the dividers 504#1 and 504#3 is inputted, are disposed at upper and lower positions in FIG. 6, respectively. The combiner 505#1, to which the other of the output signals from the divider 504#1 and One of output signals from the divider 504#2 are inputted, and the amplifier 506#2 are disposed substantially at the middle of the dividers 504#1 and 504#2 in the vertical direction in FIG. 6. The combiner 505#2, to which the other of the output signals from the divider 504#2 and the other of the output signals from the divider 504#3 are inputted, and the amplifier 506#3 are disposed substantially at the middle of the dividers 504#2 and 504#3 in the vertical direction.

Similarly, in the third stage circuit 603, the dividers 507#1 to 507#4 are disposed in this order from top to bottom in FIG. 6. The amplifiers 509#1 and 509#5 are disposed at upper and lower positions in FIG. 6, respectively. The combiner 508#1 and the amplifier 509#2 are disposed substantially at the middle of the dividers 507#1 and 507#2 in the vertical direction in FIG. 6. The combiner 508#2 and the amplifier 509#3 are disposed substantially at the middle of the dividers 507#2 and 507#3 in the vertical direction in FIG. 6. The combiner 508#3 and the amplifier 509#4 are disposed substantially at the middle of the dividers 507#3 and 507#4 in the vertical direction in FIG. 6. Accordingly, output signals from the power supply circuit 217 have phases within a range having both ends at the phases of input signals $a_1$ and $a_2$.

Thus, $a_1^{(3)}$ as an output signal from the amplifier 509#1 is a signal having a phase same as that of signal $a_1$, and $a_5^{(3)}$ as an output signal from the amplifier 509#5 is a signal having a phase same as that of signal $a_2$. In addition, $a_1^{(3)}$ to $a_5^{(3)}$ as output signals from the amplifiers 509#1 to 509#5 are signals having sequentially advanced or retarded phases, indicating that the phases of $a_1^{(3)}$ to $a_5^{(3)}$ are gradually different.

Output signals $a_1^{(3)}$ to $a_5^{(3)}$ are inputted to the phase shifters 510#1 to 510#5, respectively, at which the phases thereof are controlled, and then inputted to the antenna elements 511#1 to 511#5.

Although FIG. 6 illustrates the power supply circuit having a three-stage configuration, signals having gradually different phases are inputted to N+2 antenna elements when the number of stages of circuits in the power supply circuit 217 is N (N>3). A signal having a phase same as that of $a_1$ is inputted to an antenna element illustrated at top in FIG. 6 among the antenna elements, and a signal having a phase same as that of $a_2$ is inputted to an antenna element illustrated at bottom in FIG. 6.

Typically, the n-th stage (1≤n≤N) circuit receives n+1 signals and outputs n+2 signals. When the n+1 input signals are represented by $a_1^{(n-1)}, a_2^{(n-1)}, \ldots, a_{n+1}^{(n-1)}$, and the n+2 output signals are represented by $a_1^{(n)}, a_2^{(n)}, \ldots, a_{n+2}^{(n)}$, $a_1^{(0)}=a_1$ and $a_2^{(0)}=a_2$ hold for n=1. Output signals $a_1^{(n)}$ and $a_{n+2}^{(n)}$ have phases same as those of $a_1^{(n-1)}$ and $a_{n+1}^{(n-1)}$, respectively. Output signal $a_i^{(n)}$ for i=2, 3,..., n+1 has a phase between those of $a_{i-1}^{(n-1)}$ and $a_i^{(n-1)}$.

Figure 7:
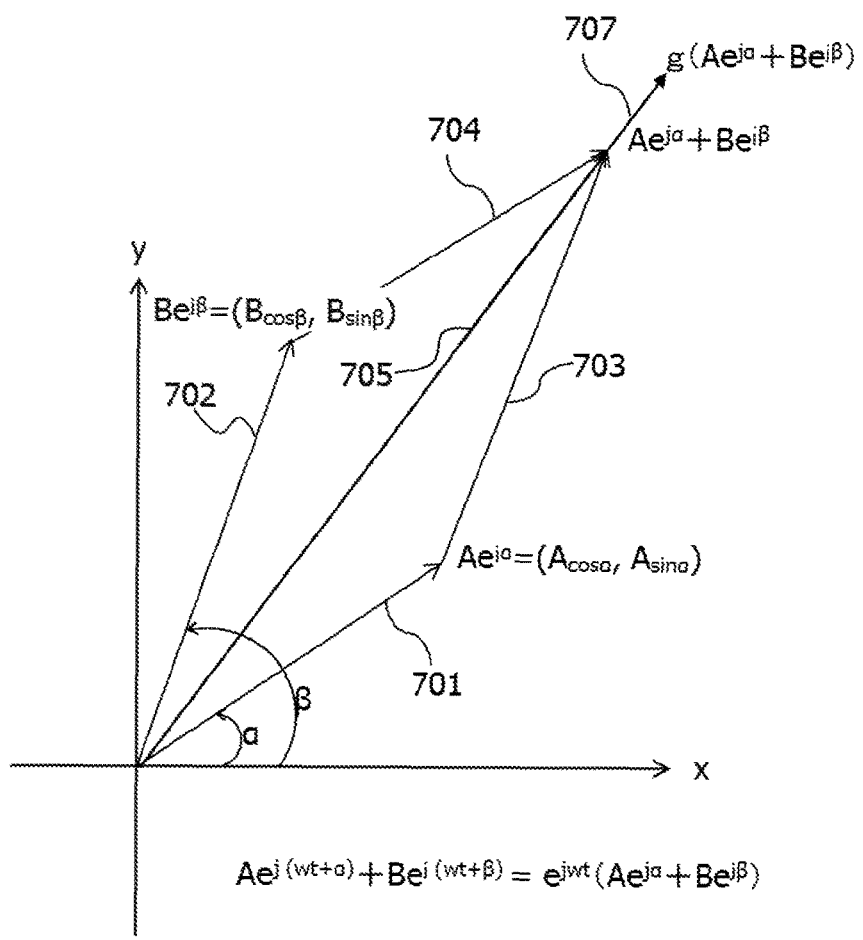
FIG. 7 is a diagram for description of change of the phase of an input signal through a combiner in the power supply circuit of the base station according to Embodiment 1.

FIG. 7 is a diagram for description that an output signal from a combiner has a phase at the middle of the phases of two input signals to the combiner. The input signals to the combiner are represented by $Ae^{j(\omega t+\alpha)}$ and $Be^{j(\omega t+\beta)}$, respectively, where A and B are each a positive real number representing the magnitude of amplitude, ω is the angular frequency of a radio signal, t is a temporal variable, and α and β are each a real number representing phase.

Synthesis of $Ae^{j(\omega t+\alpha)}$ and $Be^{j(\omega t+\beta)}$ obtains $Ae^{j(\omega t+\alpha)}+Be^{j(\omega t+\beta)}=e^{j\omega t}\times(Ae^{j\alpha}+Be^{j\beta})$. Thus, the amplitude and phase of the synthesized signal are represented by $Ae^{j\alpha}+Be^{j\beta}$.

FIG. 7 illustrates $Ae^{j\alpha}$ and $Be^{j\beta}$ on the complex plane, vector 701 is expressed by $Ae^{j\alpha}=(A\cos\alpha, A\sin\alpha)$, and vector 702 is expressed by $Be^{j\beta}=(B\cos\beta, B\sin\beta)$. When understood as the sum of vectors, $Ae^{j\alpha}+Be^{j\beta}$ is the sum of vector 701 and vector 702, in other words, vector 705 obtained by adding vector 701 to vector 703 equivalent to vector 702. Alternatively, the sum of vector 701 and vector 702 is vector 705 obtained by adding vector 702 to vector 704 equivalent to vector 701.

The angle of vector 701 with respect to the x axis is α, and the angle of vector 702 with respect to the x axis is β. Thus, the angle of the vector as the sum of vector 701 and vector 702 with respect to the x axis is at the middle of α and β. When the gain (amplification rate or attenuation rate) of the amplifier 503#2 is represented by g, an output signal from the amplifier 503#3 is $g(Ae^{j\alpha}+Be^{j\beta})$, which is expressed by vector 707 having a direction same as that of vector 705, and the angle of vector 707 with respect to the x axis is at the middle of α and β.

Accordingly, an output signal from, for example, the combiner 502 or the amplifier 503#3 has a phase at the middle of the phases of two input signals.

As illustrated in FIG. 7, when A and B are equal to each other, vectors 701, 703, 704, and 702 form a rhombus, and thus the angle of vector 705 with respect to the x axis is at the middle of α and β.

As B is increased while A is fixed, the angle of vector 705 with respect to the x axis becomes closer to β. Similarly, as A is increased while B is fixed, the angle of vector 705 with respect to the x axis becomes closer to α.

Figure 8:
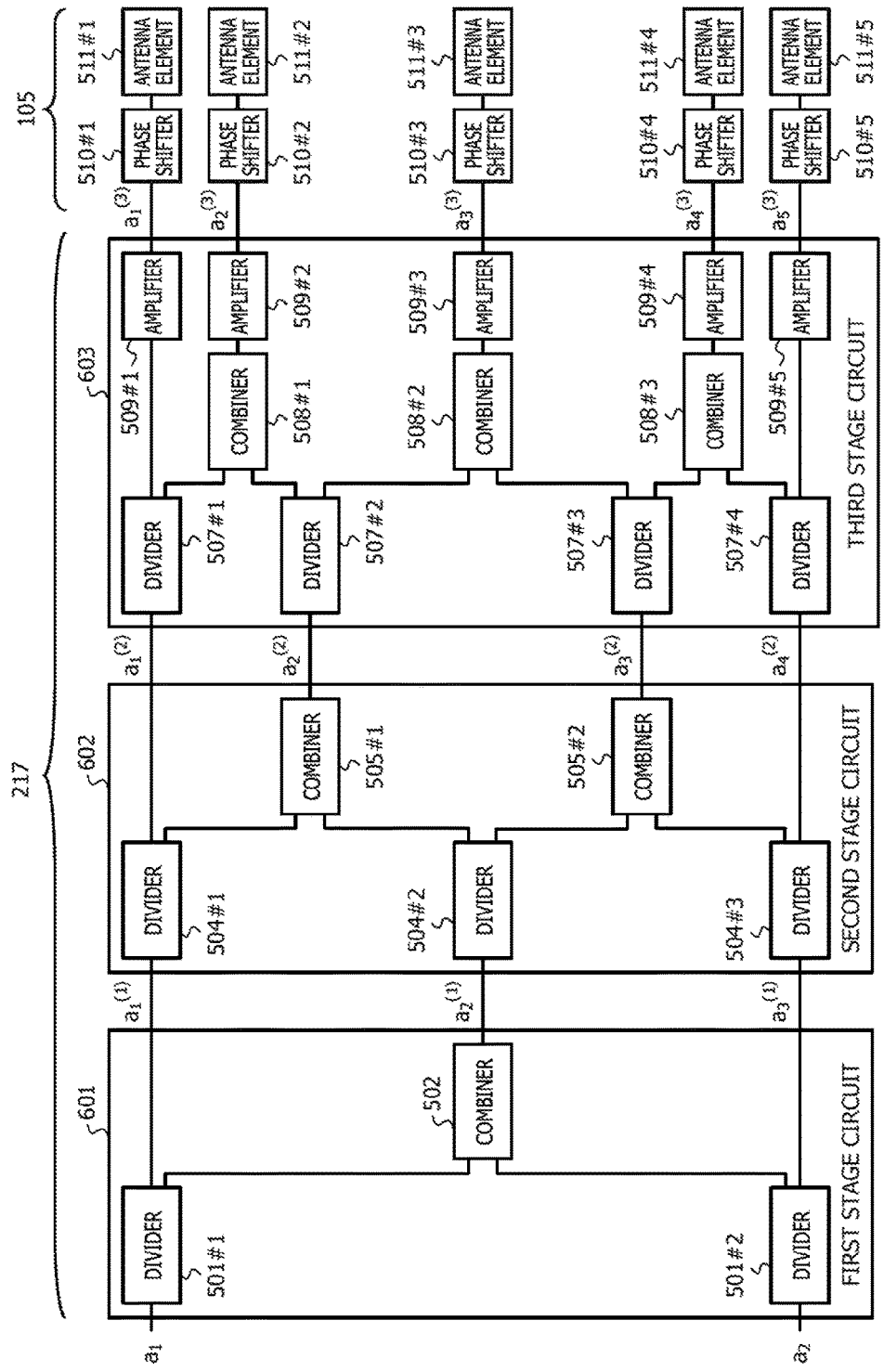
FIG. 8 is a diagram illustrating the configuration of the power supply circuit and the connection relation between the power supply circuit and the array antenna at the base station according to Embodiment 1.

FIG. 8 is a diagram illustrating another configuration of the power supply circuit 217. In FIG. 6, amplifiers are disposed at the first stage circuit 601, the second stage circuit 602, and the third stage circuit 603. This configuration allows normalization to be performed at each stage circuit.

However, in the configuration illustrated in FIG. 8, no amplifiers are disposed at the first stage circuit 601 and the second stage circuit 602, but amplifiers are disposed at the third stage circuit 603. The configuration illustrated in FIG. 8 achieves reduction in the number of amplifiers, leading to power consumption lower than that with the configuration illustrated in FIG. 6. In FIG. 8, output signals from the amplifiers 509#1 to 509#5 may be normalized.

Figure 9:
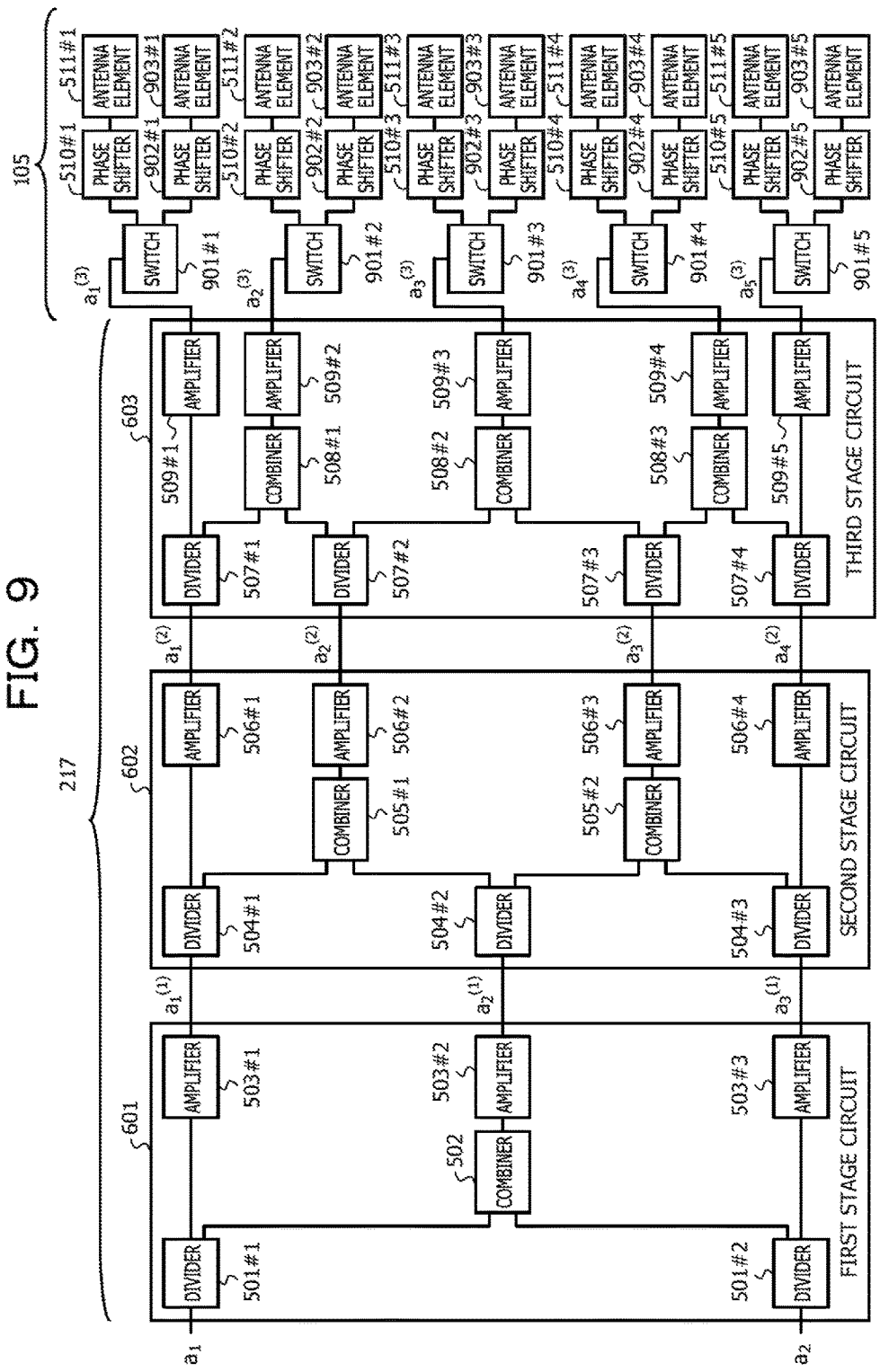
FIG. 9 is a diagram illustrating the configuration of the power supply circuit and the connection relation between the power supply circuit and the array antenna at the base station according to Embodiment 1.

FIG. 9 is a diagram illustrating another configuration of the power supply circuit 217 and connection between the power supply circuit 217 and the array antenna 105. In FIG. 9, phase shifters 902#1 to 902#5 and antenna elements 903#1 to 903#5 are disposed in addition to the phase shifters 510#1 to 510#5 and the antenna elements 511#1 to 511#5. For i=1 to 5, a pair of the phase shifter 510#i and the antenna element 511#i and a pair of the phase shifter 902#i and the antenna element 903#i are connected with the third stage circuit 603 through a switch 901#i (switch).

In this configuration, a principal surface formed by the antenna elements 511#1 to 511#5 and a principal surface formed by the antenna elements 903#1 to 903#5 may face in different directions. Thus, switching may be performed between the principal surface of the antenna elements 511#1 to 511#5 and the principal surface of the antenna elements 903#1 to 903#5 by using switches 901#1 to 901#5, thereby achieving beam pointing in a wider range.

Figure 10:
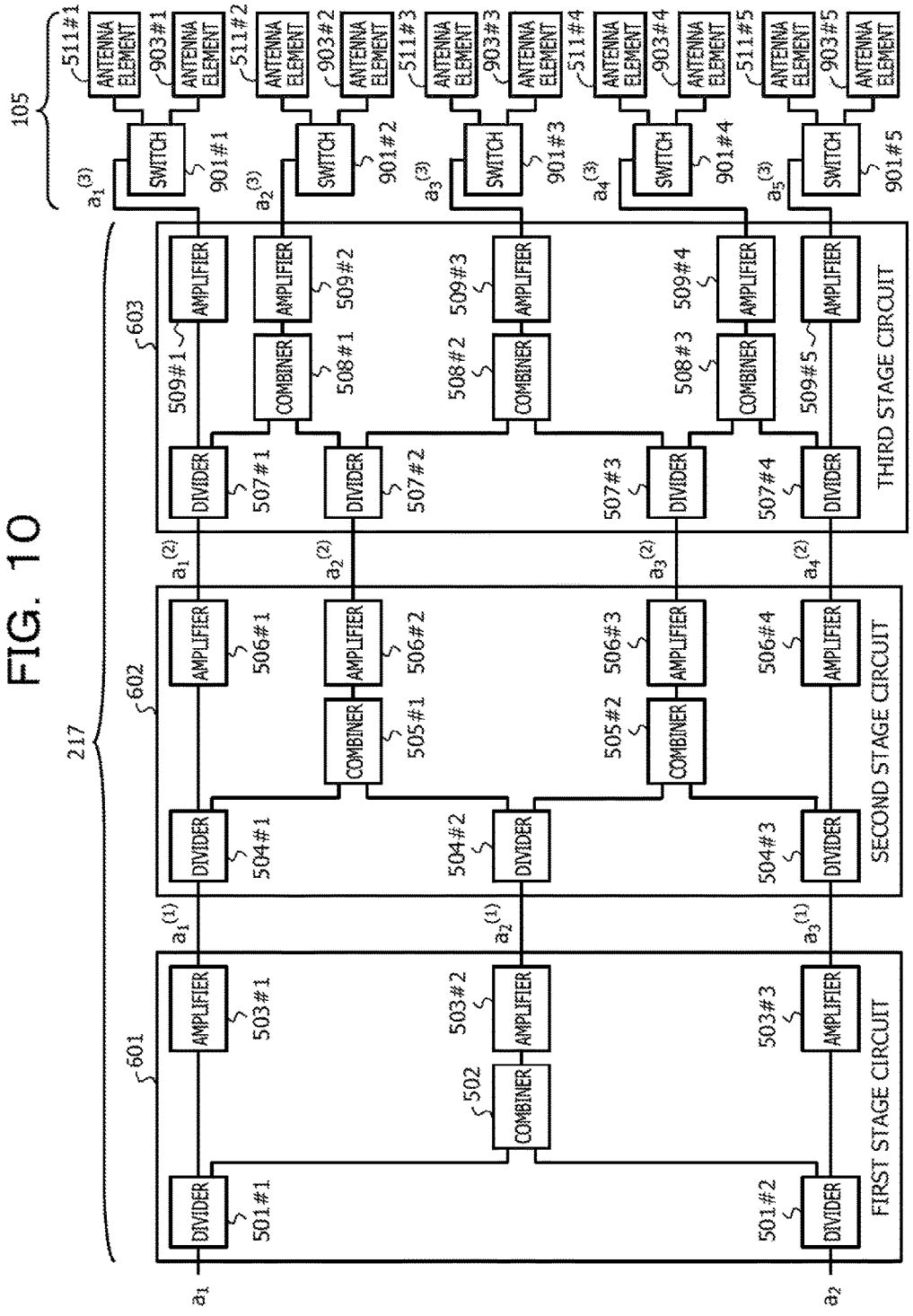
FIG. 10 is a diagram illustrating the configuration of the power supply circuit and the connection relation between the power supply circuit and the array antenna at the base station according to Embodiment 1.

In FIG. 9, the phase shifters 510#i and 902#i are disposed between the switch 901#i and the antenna element 511#i and between the switch 901#i and the antenna element 903#i, respectively, but may be omitted as illustrated in FIG. 10. Thus, phase shifters may be omitted by using antenna elements forming a principal surface facing in a direction different from that of the switches 901#1 to 901#5.

In FIG. 9, the switch 901#i selects one phase shifter from among the two phase shifters 510#i and 902#i, but the switch 901#i may be configured to select one phase shifter from among an optional number of phase shifters connected with respective antenna elements.

When phase shifters are omitted as illustrated in FIG. 10, the switch 901#i may be configured to select one antenna element from among an optional number of antenna elements. The configuration illustrated in FIG. 10 includes no phase shifter to be controlled, which makes it easy to control the array antenna 105.

Figure 11:
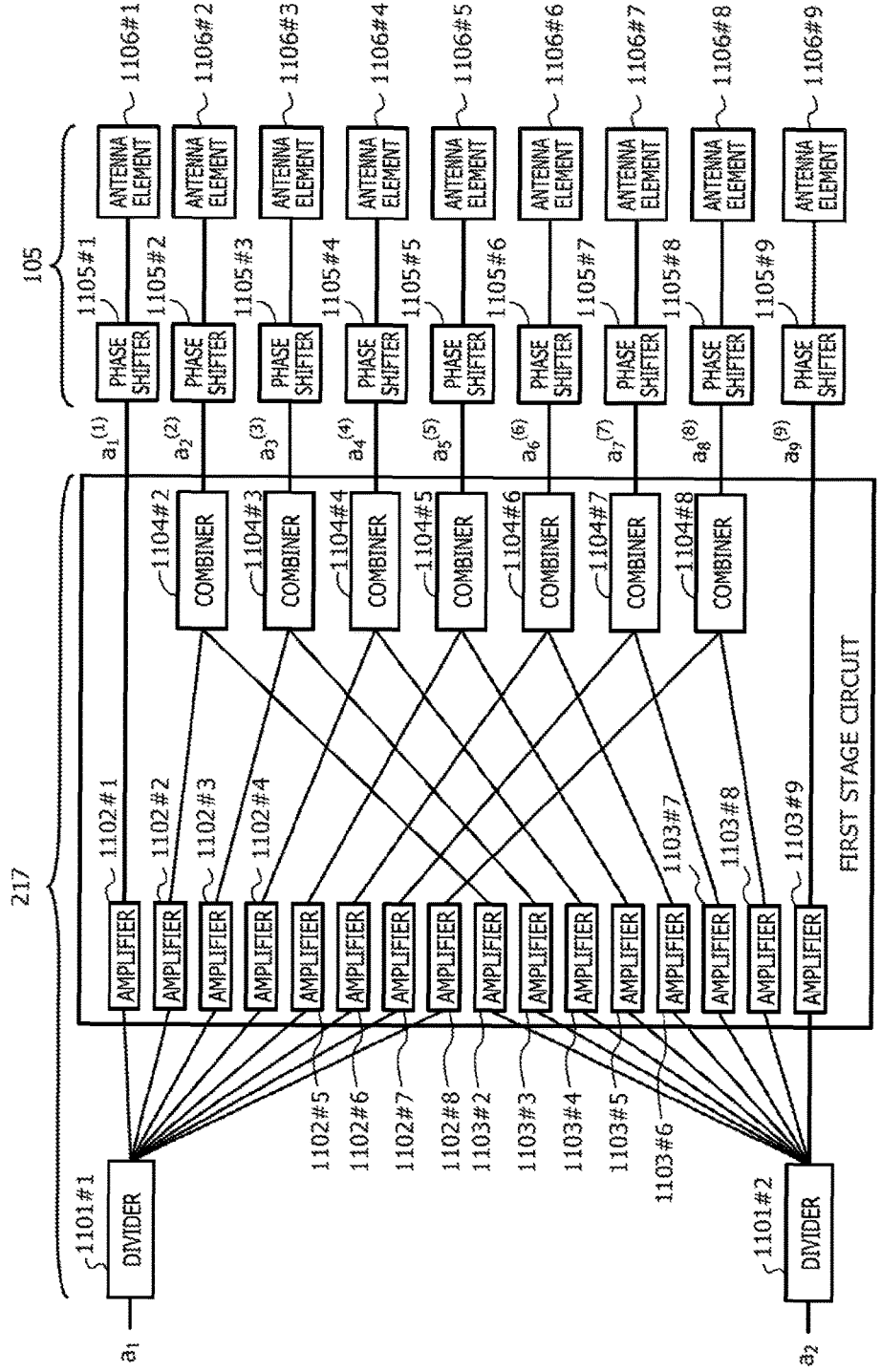
FIG. 11 is a diagram illustrating the configuration of the power supply circuit and the connection relation between the power supply circuit and the array antenna at the base station according to Embodiment 1.

FIG. 11 illustrates the power supply circuit having another configuration. Output signals $a_1$ and $a_2$ from (analog signal) the DACs 214 and 215 (refer to FIG. 2) are inputted to dividers 1101#1 and 1101#2 of the first stage circuit, respectively. The dividers 1101#1 and #2 each distribute the input analog signal into a plurality of analog signals. In FIG. 5, the analog signals inputted to the respective dividers 1101#1 and 1101#2 are each distributed into eight.

The eight output signals from the divider 1101#1 are inputted to amplifiers 1102#1 to 1102#8, respectively. An output signal from the amplifier 1102#1 among the amplifiers 1102#1 to 1102#3 is inputted to a phase shifter 1105#1. Thus, the phase shifter 1105#1 receives a signal having a phase same as that of $a_1$.

The eight output signals from the divider 1101#2 are inputted to amplifiers 1103#2 to 1103#9, respectively.

For i=2 to 8, output signals from the amplifier 1102#i and the amplifier 1103#i are inputted to a combiner 1104#i, at which analog signal synthesis is performed, and a result of the synthesis is inputted to the phase shifter 1105#i.

An output signal from the amplifier 1103#9 is inputted to the phase shifter 1105#9. Thus, the phase shifter 1105#9 receives a signal having a phase same as that of $a_2$.

For j=1 to 9, the phase shifter 1105#i is connected with an antenna element 1106#i.

In the configuration illustrated in FIG. 11, the gains of the amplifiers 1102#1 to 1102#8 and 1103#2 to 1103#9 may be adjusted so that signals inputted to the phase shifters 1105#1 to 1105#9 have gradually different phases. This difference is same as those in the power supply circuits illustrated in FIGS. 5, 6, and 8 to 10. In other words, output signals from the amplifiers 1102#1 to 1102#8 and 1103#2 to 1103#9 may have sequentially advanced or retarded phases. In addition, weighting of distribution at the dividers 1101#1 and #2 and weighting of synthesis at the combiners 1104#2 to #8 may be adjusted so that signals inputted to the phase shifters 1105#1 to 1105#9 have gradually different phases.

Figure 12:
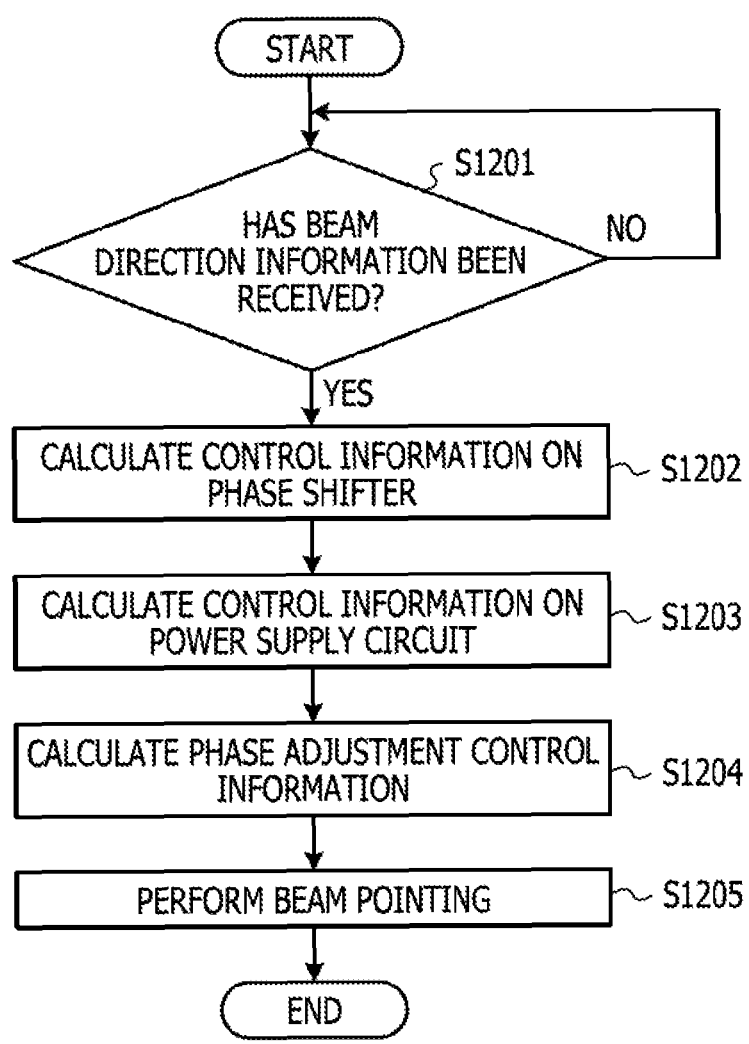
FIG. 12 is a flowchart of processing at the base station according to Embodiment 1.

FIG. 12 is a flowchart illustrating exemplary processing of pointing a beam of radio signals transmitted by the array antenna 105 at the base station 101 to each of wireless terminal apparatuses 102#1 to 102#3. At step S1201, the beam direction determiner 201 waits for reception of beam direction information. Upon reception of the beam direction information, the process proceeds from step S1201 to "YES" to perform calculation of control information on phase shifters at step S1202. The control information on phase shifters determines the direction of a beam formed by the array antenna 105. When the array antenna 105 includes a switch, selection of the switch is performed.

At step S1203, the circuit control unit 202 determines control information related to the gain of each amplifier and weighting parameters of synthesis at each combiner and distribution at each divider of the power supply circuit 217. However, step S1203 may be omitted when the power supply circuit 217 does not include no divider, amplifier, and combiner, parameters of which are variable.

At step S1204, the phase control unit 203 calculates phase adjustment control information for controlling the phase adjusters 211#1 to 211#3. The phase adjustment control information includes complex values supplied to multiplication units of the phase adjusters 211#1 to 211#3.

At step S1205, beam pointing is performed based on the control information calculated above.

Figure 13:
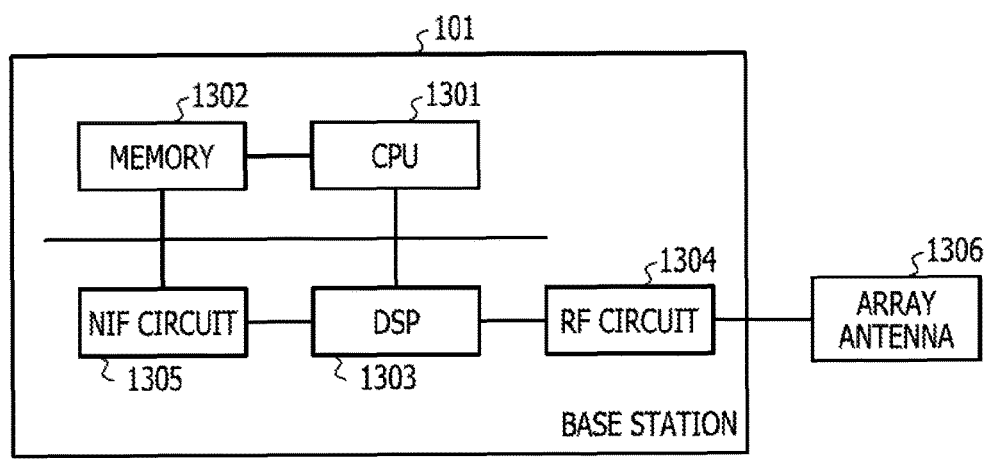
FIG. 13 is a hardware configuration diagram of the base station according to Embodiment 1.

FIG. 13 is a hardware configuration diagram of the base station 101. The base station 101 includes a CPU 1301, a memory 1302, a digital signal processor (DSP) 1303, a RF circuit 1304, a NIF circuit 1305, and an array antenna 1306.

The CPU 1301 executes a computer program stored in the memory 1302. When executed, this computer program achieves the functionality of the control unit 106. The computer program may include device drivers that allow the control unit 106 to access the DSP 1303 and the NIF circuit 1305.

The memory 1302 stores therein the computer program and provides a work area for execution of the computer program.

Instead of the execution of the computer program stored in the memory 1302 by the CPU 1301, a field programmable gate array (FPGA) may be employed to provide the functionality of the control unit 106 by hardware processing.

The NIF circuit 1305 is a hardware circuit for providing the functionality of the NIF circuit 107.

The DSP 1303 is a processor configured to perform signal processing, and provides the functionality of the baseband unit 103. The DSP 1303 may be achieved by the CPU. Alternatively, the DSP 1303 may achieved by a FPGA.

The RF circuit 1304 is a hardware circuit for providing the functionality of the RF circuit 104.

The array antenna 1306 is a hardware circuit for providing the functionality of the array antenna 105.

As described above, in one aspect, the use of a larger number of the phase adjusters 211#1 to 211#3 than the number of the DACs 214 and 215 allows a beam from the array antenna 105 to point in a larger number of directions than the number of the DACs 214 and 215. In addition, increase in the number of the DACs 214 and 215 is reduced, leading to reduction in power consumption at the base station 101.

(Embodiment 2)

Figure 14:
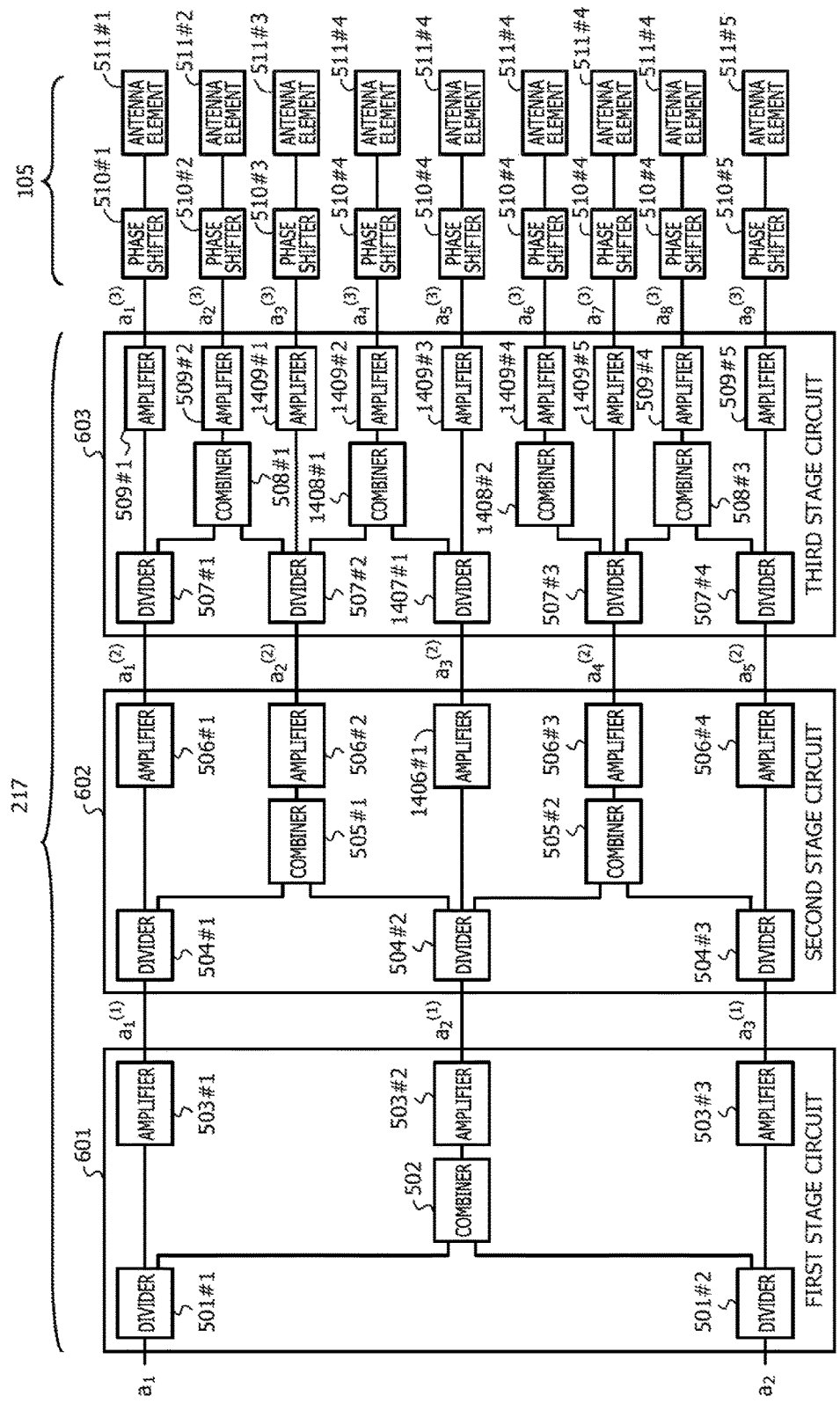
FIG. 14 is a diagram illustrating the configuration of the power supply circuit and the connection relation between the power supply circuit and the array antenna at the base station according to Embodiment 2.

FIG. 14 is a diagram illustrating an exemplary circuit configuration of the power supply circuit 217 according to Embodiment 2 and exemplary connection between the power supply circuit 217 and the array antenna 105. In FIG. 14, the power supply circuit 217 has a three-stage configuration including the first stage circuit 601, the second stage circuit 602, and the third stage circuit 603.

In FIG. 14, similarly to, for example, FIG. 6, phase differences between input signals to dividers, input signals to amplifiers, and output signals from combiners are represented by relations between the vertical positions of the dividers, the amplifiers, and the combiners in FIG. 14. Accordingly, analog signals $a_1$ and $a_2$ inputted to the first stage circuit 601 from the DACs 214 and 215 (refer to FIG. 2) are disposed at upper and lower positions in FIG. 6, respectively.

Analog signals $a_1$ and $a_2$ are inputted to the dividers 501#1 and 501#2, respectively. The dividers 501#1 and 501#2 are disposed at upper and lower positions in FIG. 6, respectively. One of output signals from the divider 501#1 is inputted to the amplifier 503#1, and One of output signals from the divider 501#2 is inputted to the amplifier 503#3. The other of the output signals from the divider 501#1 and the other of the output signals from the divider 501#2 are inputted to the combiner 502, at which analog signal synthesis is performed, and a result of the synthesis is inputted to the amplifier 503#2.

The amplifiers 503#1 to 503#3 each amplify or attenuate an input analog signal, and input the analog signal to the second stage circuit 602.

Output signals from the amplifiers 503#1 to 503#3, which are represented by $a_1^{(1)}$ to $a_3^{(1)}$, respectively, are inputted to the dividers 504#1 to 504#3. Similarly to, for example, FIG. 6 according to Embodiment 1, the dividers 504#1 and 504#3 each distribute an input signal into two. However, unlike FIG. 6, the divider 504#2 distributes an input signal into three. Three output signals from the divider 504#2 are referred to as first to third output signals.

One of output signals from the divider 504#1 is inputted to the amplifier 506#1. One of output signals from the divider 504#3 is outputted to an amplifier 506#5. The other of the output signals from the divider 504#1 and the first output signal from the divider 504#2 are outputted to the combiner 505#1. The third output signal from the divider 504#2 and the other of the output signals from the divider 504#3 are outputted to the combiner 505#2.

An output signal from the combiner 505#1 is outputted to the amplifier 506#2. The second output signal from the divider 504#2 is outputted to an amplifier 1406#1. An output signal from the combiner 505#2 is outputted to the amplifier 506#3.

When output signals from the amplifiers 506#1 to 506#4 and the amplifier 1406#1 are represented by $a_1^{(2)}, a_2^{(2)}, a_4^{(2)}, a_5^{(2)}$ and $a_3^{(1)}$, respectively, output signals $a_1^{(2)}$ to $a_5^{(2)}$ from the second stage circuit 602 are inputted to the third stage circuit 603.

Output signal $a_1^{(2)}$ is inputted to the divider 507#1. The divider 507#1 distributes $a_1^{(2)}$ into two, and the distributed signals are inputted to the amplifier 509#1 and the combiner 508#1.

Output signal $a_2^{(2)}$ is inputted to the divider 507#2. The divider 507#2 distributes $a_2^{(2)}$ into three, and the distributed signals are inputted to the combiner 508#1, an amplifier 1409#1, and a combiner 1408#1.

Output signal $a_3^{(2)}$ is inputted to a divider 1407#1. The divider 1407#1 distributes $a_3^{(2)}$ into three, and the distributed signals are inputted to the combiner 1408#1, an amplifier 1409#3, and a combiner 1408#2.

Output signal $a_4^{(2)}$ is inputted to the divider 507#3. The divider 507#3 distributes $a_4^{(2)}$ into three, and the distributed signals are inputted to the combiner 1408#2, an amplifier 1409#5, and the combiner 508#3.

Output signal $a_5^{(2)}$ is inputted to the divider 507#4. The divider 507#4 distributes $a_5^{(2)}$ into two, and the distributed signals are inputted to the combiner 508#3 and the amplifier 509#5, respectively.

The combiner 508#1 synthesizes input analog signals, and inputs a result of the synthesis to the amplifier 509#2.

The combiner 1408#1 synthesizes input analog signals, and inputs a result of the synthesis to an amplifier 1409#2.

The combiner 1408#2 synthesizes input analog signals, and inputs a result of the synthesis to an amplifier 1409#4.

The combiner 508#3 synthesizes input analog signals, and outputs a result of the synthesis to the amplifier 509#4.

The amplifiers 509#1, 509#2, 1409#1, 1409#2, 1409#3, 149#4, 1409#5, 509#4, and 509#5 each amplify or attenuate an input signal. Output signals from the amplifiers 509#1, 509#2, 1409#1, 1409#2, 1409#3, 1409#4, 1409#5, 509#4, and 509#5 are output signals $a_1^{(3)}$ to $a_9^{(3)}$ from the third stage circuit 603.

Output signals $a_1^{(3)}$ to $a_9^{(3)}$ are outputted to the phase shifters 510#1, 510#2, 1410#1 to 1410#5, 510#4, and 510#5, respectively. Signals having phases controlled by the phase shifters 510#1, 510#2, 1410#1 to 1410#5, 510#4, and 510#5 are outputted to the antenna elements 511#1, 511#2, 1411#1 to 1411#5, 511#4, and 511#5, respectively.

FIGS. 6 and 14 differ from each other in that the divider 504#2 of the second stage circuit 602 distributes a signal into two in FIG. 6 but into three in FIG. 14, and in that the dividers 507#2 and #3 of the third stage circuit 603 each distribute a signal into two in FIG. 6 but into three in FIG. 14. In addition, the divider 1407#1 is additionally provided in FIG. 14. Accordingly, the amplifier 1406#1, the combiner 1408#1, the combiner 1408#2, and the amplifiers 1409#1 to 1409#5 are additionally provided in FIG. 14. In addition, the phase shifters 1410#1 to 1410#5 and the antenna elements 1411#1 to 1411#5 are additionally provided in FIG. 14. This configuration allows radio signals to be supplied to a large number of antenna elements through a smaller number of stages of circuits than that in Embodiment 1.

When normalization is performed through the amplifiers of the circuit at each stage with $a_1 = Ae^{j(0+\alpha)}$ and $a_2 = Ae^{j(0+\beta)}$, the output signals from the dividers are expressed as follows:

Each output signal from the divider 501#1 is given by Expression 1, and each output signal from the divider 501#2 is given by Expression 2.

$$\frac{Ae^{j(\theta+\alpha)}}{\sqrt{2}} \qquad \text{[Expression 1]}$$

$$\frac{Ae^{j(\theta+\beta)}}{\sqrt{2}} \qquad \text{[Expression 2]}$$

Each output signal from the divider 504#1 is given by Expression 3, each output signal from the divider 504#2 is given by Expression 4, and each output signal from the divider 504#3 is given by Expression 5.

$$\frac{Ae^{j(\theta+\alpha)}}{\sqrt{2}} \qquad \text{[Expression 3]}$$

$$\frac{Ae^{j\left(\theta+\frac{\alpha+\beta}{2}\right)}}{\sqrt{3}} \qquad \text{[Expression 4]}$$

$$\frac{Ae^{j(\theta+\beta)}}{\sqrt{2}} \qquad \text{[Expression 5]}$$

Each output signal from the divider 507#1 is given by Expression 6, each output signal from the divider 507#2 is given by Expression 7, each output signal from the divider 1407#1 is given by Expression 8, and each output signal from the divider 507#3 is given by Expression 9. Each output signal from the divider 507#4 is given by Expression 10.

$$\frac{Ae^{j(\theta+\alpha)}}{\sqrt{2}} \qquad \text{[Expression 6]}$$

$$\frac{A}{\sqrt{3}}\left(\left[\frac{e^{j(\theta+\alpha)}}{\sqrt{2}} + \frac{e^{j\left(\theta+\frac{\alpha+\beta}{2}\right)}}{\sqrt{3}}\right]\middle/\left[\frac{e^{j(\theta+\alpha)}}{\sqrt{2}} + \frac{e^{j\left(\theta+\frac{\alpha+\beta}{2}\right)}}{\sqrt{3}}\right]\right) \qquad \text{[Expression 7]}$$

$$\frac{Ae^{j\left(\theta+\frac{\alpha+\beta}{2}\right)}}{\sqrt{3}} \qquad \text{[Expression 8]}$$

$$\frac{A}{\sqrt{3}}\left(\left[\frac{e^{j\left(\theta+\frac{\alpha+\beta}{2}\right)}}{\sqrt{3}} + \frac{e^{j(\theta+\beta)}}{\sqrt{2}}\right]\middle/\left[\frac{e^{j\left(\theta+\frac{\alpha+\beta}{2}\right)}}{\sqrt{3}} + \frac{e^{j(\theta+\beta)}}{\sqrt{2}}\right]\right) \qquad \text{[Expression 9]}$$

$$\frac{Ae^{j(\theta+\beta)}}{\sqrt{2}} \qquad \text{[Expression 10]}$$

Figure 15:
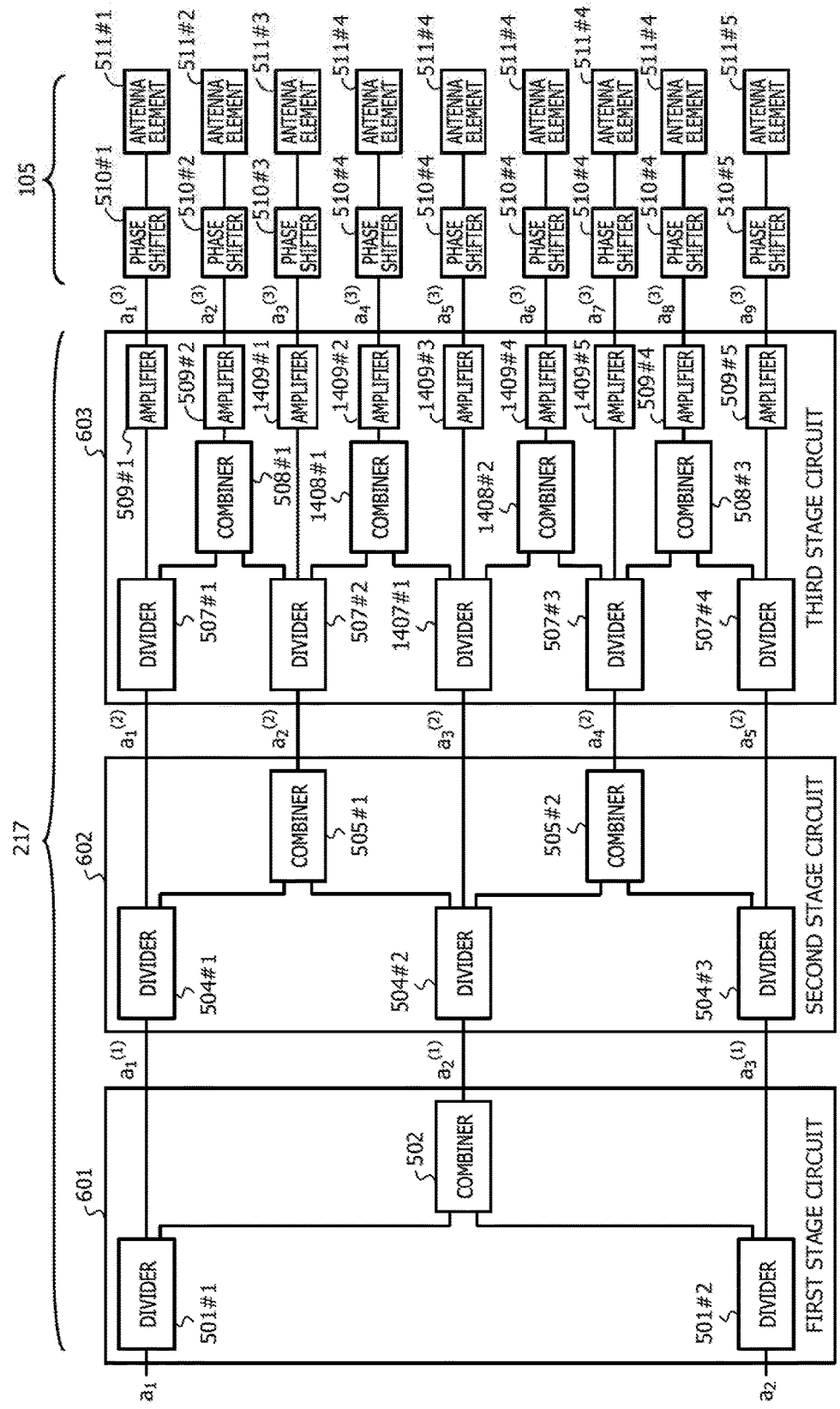
FIG. 15 is a diagram illustrating the configuration of the power supply circuit and the connection relation between the power supply circuit and the array antenna at the base station according to Embodiment 2.

FIG. 15 is a diagram illustrating the configuration of a power supply circuit obtained by removing amplifiers from the first stage circuit 601 and the second stage circuit 602 of the power supply circuit illustrated in FIG. 14. With the configuration illustrated in FIG. 15, the number of amplifiers is smaller than that of the configuration illustrated in FIG. 14, leading to reduction in power consumption. A result of simulation to be described later indicates that, when normalization is performed through amplifiers at a circuit (third stage circuit) of the last stage, a power supply circuit having the configuration illustrated in FIG. 15 has directionality same as the directionality of a power supply circuit having the configuration illustrated in FIG. 16.

Figure 16:
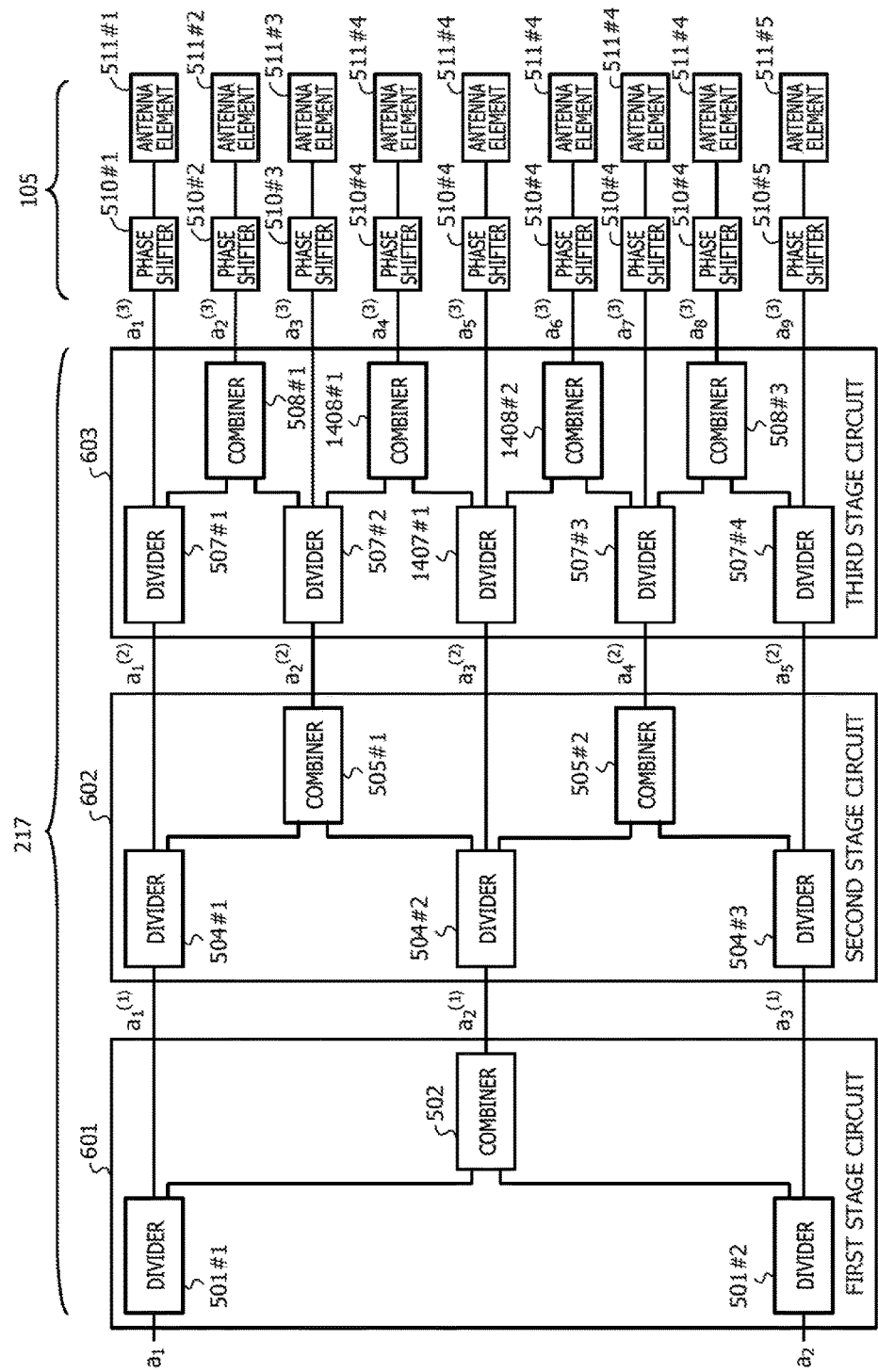
FIG. 16 is a diagram illustrating the configuration of the power supply circuit and the connection relation between the power supply circuit and the array antenna at the base station according to Embodiment 2.

FIG. 16 is a diagram illustrating the configuration of a power supply circuit obtained by further removing amplifiers from the third stage circuit 603 of the power supply circuit illustrated in FIG. 15. A result of simulation to be described later indicates that this power supply circuit has directionality substantially same as the of directionalities power supply circuits having the configurations in FIGS. 14 and 15.

As described above, in addition to the effect of Embodiment 1,the use of a divider configured to distribute a signal into three in the Embodiment 2 provides a power supply circuit including the same number of stages of circuits as that in Embodiment 1 and connected with a larger number of antenna elements than that in Embodiment 1.

(Embodiment 3)

In Embodiments 1 and 2,the number of input signals to the power supply circuit is two. In other words, the number of input signals to the first stage circuit 601 is two, and the number of input signals to the second stage circuit 602 is three. Thus, a power supply circuit with three inputs is obtained when, in the power supply circuit according to Embodiments 1 and 2,the first stage circuit 601 is omitted, the second stage circuit 602 is replaced with a first stage circuit 601', and the third stage circuit 603 is replaced with a second stage circuit 602'.

Figure 17:
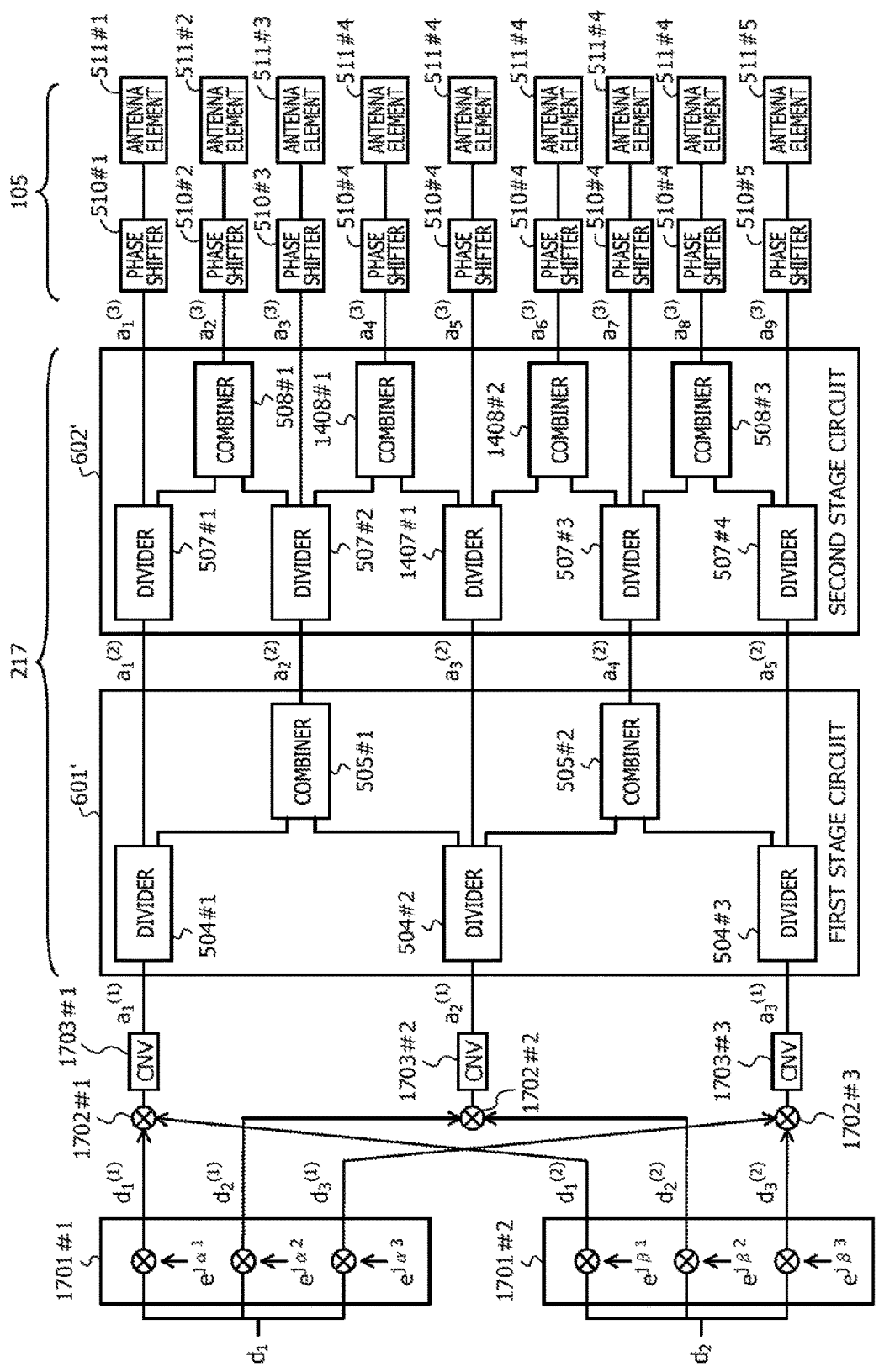
FIG. 17 is a diagram illustrating the configuration of the power supply circuit and the connection relation between the power supply circuit and the array antenna at the base station according to Embodiment 3.

For example, as illustrated in FIG. 17, phase adjusting circuits 1701#1 and 1701#2 obtain $d_1^{(1)}$ to $d_3^{(1)}$ and $d_1^{(2)}$ to $d_3^{(2)}$, respectively, by multiplying input digital baseband signals $d_1$ and $d_2$ with three complex values. Signals $d_1^{(1)}$ to $d_3^{(1)}$ and $d_1^{(2)}$ to $d_3^{(2)}$ are inputted to combiners 1702#1 to 1702#3 and first to third converters (CNV) 1703#1 to 1703#3, and then inputted to the first stage circuit 601'.

Although FIG. 17 only illustrates the two phase adjusting circuits 1701#1 and 1701#2, an output signal from any additional phase adjusting circuit may be inputted to the combiners 1702#1 to 1702#3.

The following describes a typical example. In this example, m (K is a natural number equal to or larger than two) DACs are provided, and output signals from the m DACs are represented by $a_1, a_2, \ldots, a_m$. Output signals $a_1, a_2, \ldots, a_m$ have advanced or retarded phase progression in this order. The first stage circuit outputs a signal having a phase same as that of $a_1$, a signal having a phase same as that of a signal obtained by inputting $a_{i-a}$ and $a_i$ to a combiner for i=2, 3,..., m−1,a signal having a phase same as that of $a_i$, and a signal having a phase same as that of $a_m$.

Analog signals outputted from the n-th stage circuit (n is a natural number equal to or larger than one) are represented by $a_1^{(n)}, a_2^{(n)}, a_m^{(n)}$. Output signals $a_1^{(n)}, a_2^{(n)}, \ldots, a_M^{(n)}$ have gradually different phases. In other words, $a_2^{(n)}, \ldots, a_{M-1}^{(n)}$ have phases obtained through interpolation of phase between the phases of $a_1^{(n)}$ and $a_M^{(n)}$, and $a_1^{(n)}$, and are signals having sequentially advanced or retarded phase progression. In this case, the (n+1)-th stage circuit outputs a signal having a phase same as that of $a_1^{(n)}$, a signal having a phase same as that of a signal obtained by inputting $a_{i-1}$ and $a_i$ to a combiner for i=2, 3,... M−1,a signal having a phase same as that of $a_i$, and a signal having a phase same as that of $a_M$.

With this configuration, the number of input signals to the power supply circuit 217 is made to be an optional number equal to or larger than three. Accordingly, for example, when the array antenna includes a large number of antenna elements, the number of input signals to the power supply circuit 217 is allowed to be increased to reduce the number of stages of circuits.

(Embodiment 4)

Embodiments 1 to 3 each describe the power supply circuit 217 having a configuration in which an analog signal outputted from the upconverter 216 is outputted to the array antenna 105. When input and output of the phase shifters 219 are reversed, the dividers and the combiners are interchanged, inputs and outputs of the amplifiers, the dividers, and the combiners of the power supply circuit 217 are reversed, a reception power supply circuit configured to output a radio signal received by the array antenna 105 to a downconverter is obtained.

Figure 18:
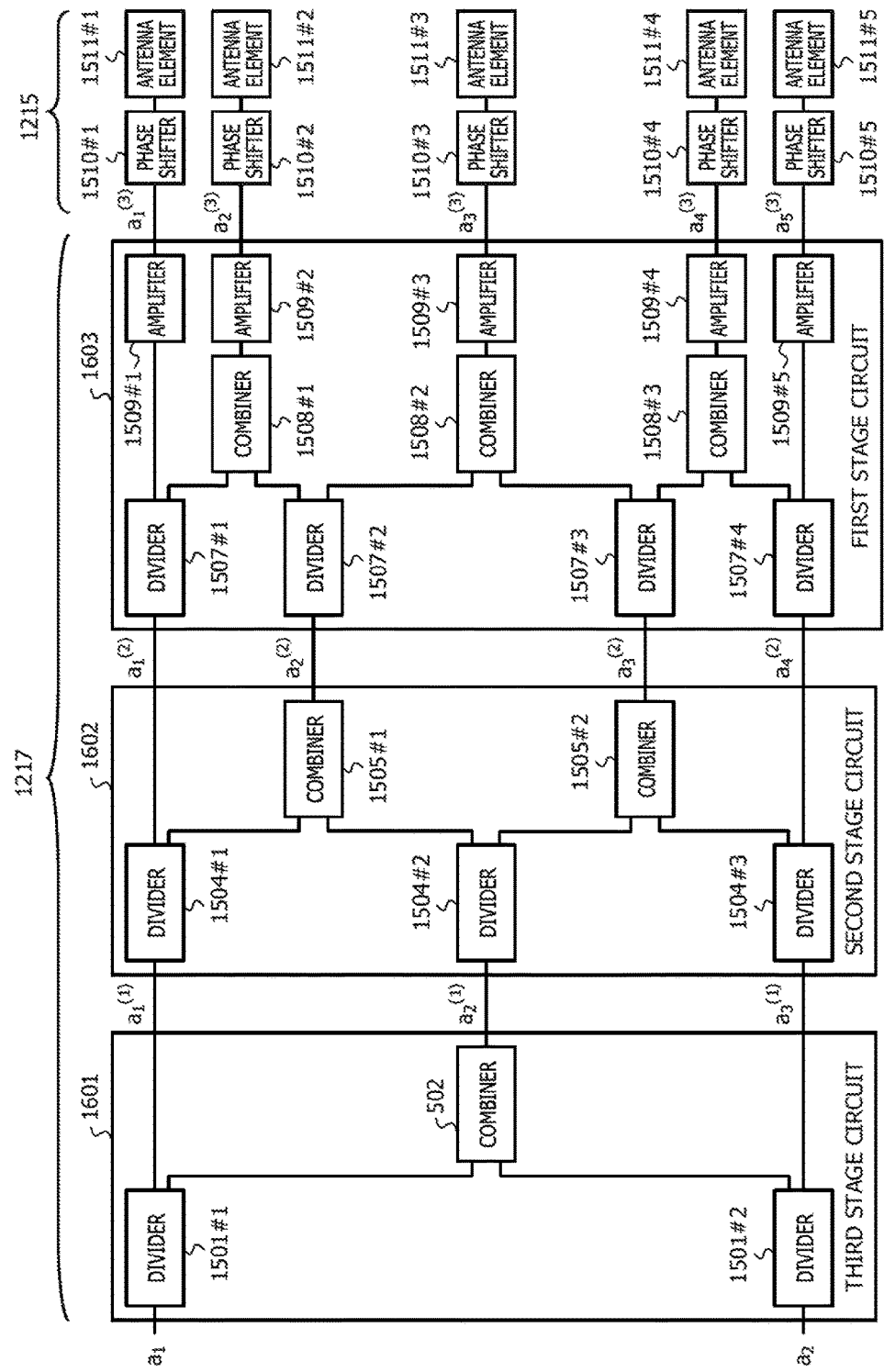
FIG. 18 is a diagram illustrating the configuration of the power supply circuit and the connection relation between the power supply circuit and the array antenna at the base station according to Embodiment 4.

FIG. 18 is a diagram illustrating an exemplary configuration of a reception power supply circuit 1217 and exemplary connection between the power supply circuit 1217 and the array antenna 105.

An array antenna 1215 includes antenna elements 1511#1 to 1511#5 and phase shifters 1510#1 to 1510#5. Radio signals received by the antenna elements 1511#1 to 1511#5 are inputted to the phase shifters 1510#1to 1510#5, respectively. The phase shifters 1510#1 to 1510#5 control the phases of the input radio signals and input analog signals $a_1^{(3)}$ to $a_5^{(3)}$, respectively, to the first stage circuit 1603 of the power supply circuit 1217. In this manner, radio signals received from a particular direction are made to be inputted to the power supply circuit 1217 as $a_1^{(3)}$ to $a_5^{(3)}$ having sequentially advanced or retarded phases in this order.

The first stage circuit 1603 of the power supply circuit 1217 includes amplifiers 1509#1 to 1509#5, and amplifies radio signals inputted from the phase shifters 1510#1 to 1510#5, respectively. Output signals from the amplifiers 1509#2, 1509#3, and 1509#4 are inputted to dividers 1508#1 to 1508#3, respectively, and each distributed into two.

The output signal from the amplifier 1509#1 and one of output signals from the divider 1508#1 are inputted to a combiner 1507#1, at which analog signal synthesis is performed to obtain output signal $a_1^{(2)}$ from the first stage circuit 1603.

The other of the output signals from the divider 1508#1 and one of output signals from the divider 1508#2 are inputted to a combiner 1507#2, at which analog signal synthesis is performed to obtain output signal $a_2^{(2)}$ from the first stage circuit 1603.

The other of the output signals from the divider 1508#2 and one of output signals from the divider 1508#3 are inputted to a combiner 1507#3, at which analog signal synthesis is performed to obtain output signal $a_3^{(2)}$ from the first stage circuit 1603.

The other of the output signals from the divider 1508#3 and the output signal from the amplifier 1509#5 are inputted to a combiner 1507#4, at which analog signal synthesis is performed to obtain output signal $a_4^{(2)}$ from the first stage circuit 1603.

Output signals $a_1^{(2)}$ to $a_4^{(2)}$ from the first stage circuit 1603 are inputted to a second stage circuit 1602.

Output signal $a_2^{(2)}$ from the combiner 1507#2 is inputted to a divider 1505#1, and output signal $a_3^{(2)}$ from the combiner 1507#3 is inputted to a divider 1505#2.

Output signal $a_1^{(2)}$ from the combiner 1507#1 and one of output signals from the divider 1505#1 are inputted to a combiner 1504#1, at which analog signal synthesis is performed to obtain output signal $a_1^{(1)}$ from the second stage circuit 1602.

The other of the output signals from the divider 1505#1 and one of output signals from the divider 1505#2 are inputted to a combiner 1504#2, at which analog signal synthesis is performed to obtain output signal $a_2^{(1)}$ from the second stage circuit 1602.

The other of the output signals from the divider 1505#2 and output signal $a_4^{(2)}$ from the combiner 1507#4 are inputted to a combiner 1504#3, at which analog signal synthesis is performed to obtain output signal $a_3^{(1)}$ from the second stage circuit 1602.

Output signals $a_1^{(1)}$ to $a_3^{(1)}$ from the second stage circuit 1602 are inputted to a third stage circuit 1601.

An output signal from the combiner 1504#2 is inputted to a divider 1502.

An output signal from the combiner 1504#1 and one of output signals from the divider 1502 are inputted to a combiner 1501#1, at which analog signal synthesis is performed to obtain output signal $a_1$ from the third stage circuit 1601.

The other of the output signals from the divider 1502 and an output signal from the combiner 1504#3 are inputted to a combiner 1501#2, at which analog signal synthesis is performed to obtain output signal $a_2$ from the third stage circuit 1601.

Accordingly, the power supply circuit 1217 having the configuration illustrated in FIG. 18 has a configuration in which inputs and outputs of the amplifiers of the power supply circuit 217 having the configuration illustrated in FIG. 6 are reversed and the combiners and dividers of the power supply circuit 217 are interchanged.

Figure 19:
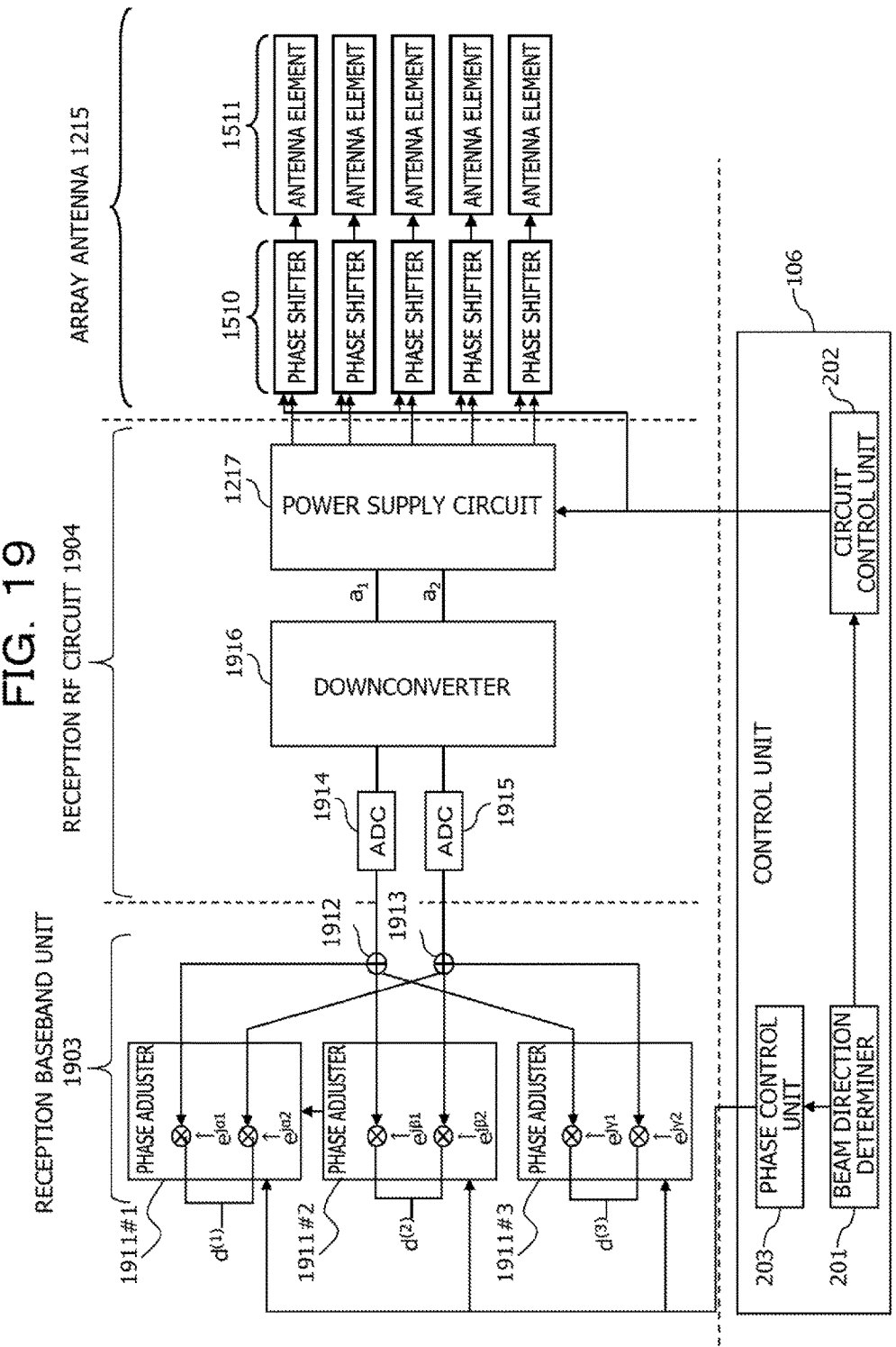
FIG. 19 is a functional block diagram of the baseband unit, the RF circuit, the array antenna, and the control unit of the base station according to Embodiment 4.

FIG. 19 is a detailed functional block diagram of a reception RF circuit 1904, a reception baseband unit 1903, and the control unit 106 of a base station including the power supply circuit 1217.

Output signals $a_1$ and $a_2$ from the power supply circuit 1217 have their frequencies converted through a downconverter 1916 of the reception RF circuit 1904 and are converted into digital signals (referred to as, for example, $d^1$ and $d^2$) through an analog digital converter (ADC) 1914. Thereafter, $d^{(1)}$ and $d^{(2)}$ are each distributed into, for example, three signals (referred to as, for example, $d_t^{(1)}$ and $d_t^{(2)}$) through a divider 1912 or 1913. Signals $d_t^{(1)}$ and $d_t^{(2)}$ are then multiplied with complex numbers to adjust the phases thereof and synthesized to provide a baseband signal (referred to as, for example, $d^{(i)}$).

The control unit 106 operates as follows. The beam direction determiner 201 determines a direction in which a beam from the principal surface of the array antenna 1215 is formed. This determination is achieved by estimating a direction from the array antenna 1215 toward each of wireless terminal apparatuses 102#1 to 102#3 by using, for example, information related to a precoding matrix transmitted from the wireless terminal apparatus. For example, the direction in which a beam from the principal surface of the array antenna 1215 is formed is determined to be a direction averaged over directions toward wireless terminal apparatuses 102#1 to 102#3.

The circuit control unit 202 controls parameters of the power supply circuit 1217 and the array antenna 1215 based on the determination by the beam direction determiner 201. For example, the array antenna 1215 includes a parameter related to phase control by the phase shifter 1510. When including an amplifier, the power supply circuit 1217 includes a parameter related to the gain of the amplifier in some cases. The circuit control unit 202 adjusts these parameters to control the direction of a beam formed by the array antenna.

The phase control unit 203 determines complex values with which phase adjusters 1911#1 to 1911#3 of the reception baseband unit 1903 multiply digital baseband signals $d^{(1)}$ to $d^{(3)}$, respectively, based on the determination by the beam direction determiner 201. In this manner, the direction of a beam formed by the array antenna is caused to point to each wireless terminal apparatus or point to null.

Similarly to Embodiments 1 to 3, as described above, it is possible to reduce the number of analog-digital converters when the power supply circuit 1217 is applied to a base station, leading to reduction in power consumption.

In FIG. 18, amplifiers are provided to the first stage circuit 1603, but may be further provided to one or both of the second stage circuit 1602 and the third stage circuit 1601.

A base station may include the power supply circuit 217 according to Embodiments 1 to 3 in which an analog signal outputted from the upconverter 216 is outputted to the array antenna 1215, and perform communication. In this case, any component usable for both transmission and reception is preferably used in common between transmission and reception. For example, the array antennas 105 and 1215 are each usable for both transmission and reception.

Figure 20:
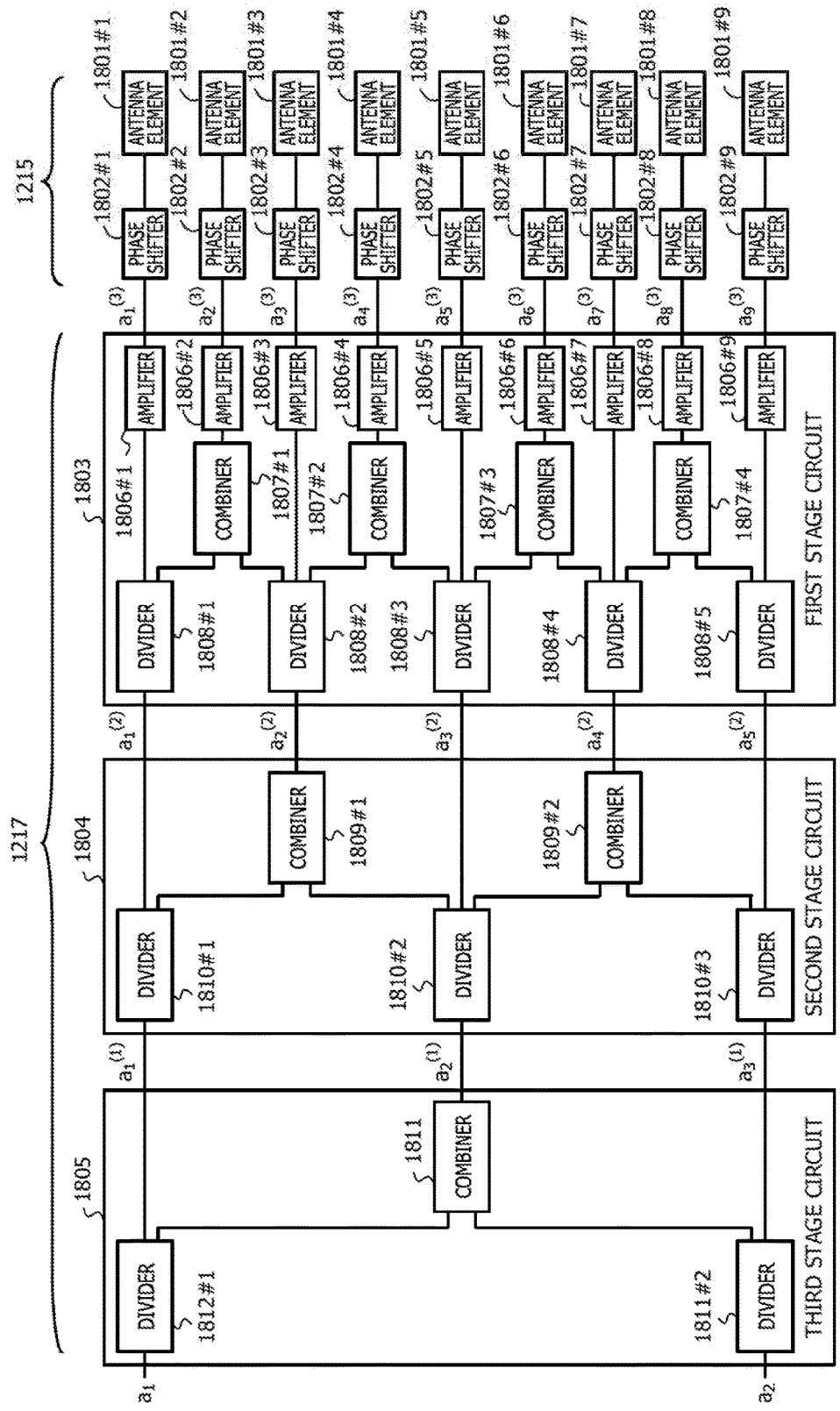
FIG. 20 is a diagram illustrating the configuration of the power supply circuit and the connection relation between the power supply circuit and the array antenna at the base station according to Embodiment 4.

FIG. 20 is a diagram illustrating another exemplary configuration of the reception power supply circuit 1217 and exemplary connection between the power supply circuit 1217 and the array antenna 1215.

The array antenna 1215 includes antenna elements 1801#1 to 1801#9 and phase shifters 1802#1 to 1802#9. Radio signals received by the antenna elements 1801#1 to 1801#9 are inputted to the phase shifters 1802#1 to 1802#9, respectively. The phase shifters 1802#1 to 1802#9 control the phases of the respective input radio signals and output the radio signals to the first stage circuit 1803 of the power supply circuit 1217. In this manner, radio signals received from a particular direction is inputted to the power supply circuit 1217 as $a_1^{(3)}$ to $a_9^{(3)}$ having sequentially advanced or retarded phases in this order.

The first stage circuit 1803 of the power supply circuit 1217 includes amplifiers 1806#1 to 1806#9 for amplifying radio signals inputted from the respective phase shifters 1802#1 to 1802#9. Output signals from the amplifiers 1806#2, 1806#4, 1806#6, and 1806#8 are inputted to dividers 1807#1, 1807#2, 1807#3, and 1807#4, respectively, and are each distributed into two.

An output signal from the amplifier 1806#1 and one of output signals from the divider 1807#1 are inputted to a combiner 1808#1, at which analog signal synthesis is performed to obtain output signal $a_1^{(2)}$ from the first stage circuit 1803.

The other of the output signals from the divider 1807#1, an output signal from an amplifier 1806#3, and one of output signals from the divider 1807#2 are inputted to a combiner 1808#2, at which analog signal synthesis is performed to obtain output signal $a_2^{(2)}$ from the first stage circuit 1803.

The other of the output signals from the divider 1807#2, an output signal from the amplifier 1806#5, and one of output signals from the divider 1807#3 are inputted to a combiner 1808#3, at which analog signal synthesis is performed to obtain output signal $a_3^{(2)}$ from the first stage circuit 1803.

The other of the output signals from the divider 1807#3, an output signal from the amplifier 1806#7, and one of output signals from the divider 1807#4 are inputted to a combiner 1808#4, at which analog signal synthesis is performed to obtain output signal $a_4^{(2)}$ from the first stage circuit 1803.

The other of the output signals from the divider 1807#4 and an output signal from the amplifier 1806#9 are inputted to a combiner 1808#5, at which analog signal synthesis is performed to obtain output signal $a_5^{(2)}$ from the first stage circuit 1803.

Output signals $a_1^{(2)}$ to $a_5^{(2)}$ from the first stage circuit 1803 are inputted to a second stage circuit 1804.

Output signal $a_2^{(2)}$ from the combiner 1808#2 is inputted to a divider 1809#1, and output signal $a_4^{(2)}$ from the combiner 1808#4 is inputted to a divider 1809#2.

Output signal $a_1^{(2)}$ from the combiner 1808#1 and one of output signals from the divider 1809#1 are inputted to a combiner 1810#1, at which analog signal synthesis is performed to provide output signal $a_1^{(1)}$ from the second stage circuit 1804.

The other of the output signals from the divider 1809#1, output signal $a_3^{(2)}$ from the combiner 1808#3, and one of output signals from the divider 1809#2 are inputted to a combiner 1810#2, at which analog signal synthesis is performed to provide output signal $a_2^{(1)}$ from the second stage circuit 1804.

The other of the output signals from the divider 1809#2 and output signal $a_5^{(2)}$ from the combiner 1808#5 are inputted to a combiner 1810#3, at which analog signal synthesis is performed to provide output signal $a_3^{(1)}$ from the second stage circuit 1804.

Output signals $a_1^{(1)}$ to $a_3^{(1)}$ from the second stage circuit 1804 are inputted to a third stage circuit 1805.

Output signal $a_2^{(1)}$ from the combiner 1810#2 is inputted to a divider 1811.

Output signal $a_1^{(1)}$ from the combiner 1810#1 and one of output signals from the divider 1811 are inputted to a combiner 1812#1, at which analog signal synthesis is performed to provide output signal $a_1$ from the third stage circuit 1805.

The other of the output signals from the divider 1811 and output signal $a_3^{(1)}$ from the combiner 1810#3 are inputted to a combiner 1812#2, at which analog signal synthesis is performed to provide output signal $a_2$ from the third stage circuit 1805.

Accordingly, the power supply circuit 1217 having the configuration illustrated in FIG. 20 has a configuration in which inputs and outputs of the amplifiers of the power supply circuit 217 having the configuration illustrated in FIG. 15 are reversed, and the combiners and dividers of the power supply circuit 217 are interchanged.

(Simulation Result)

Figure 21:
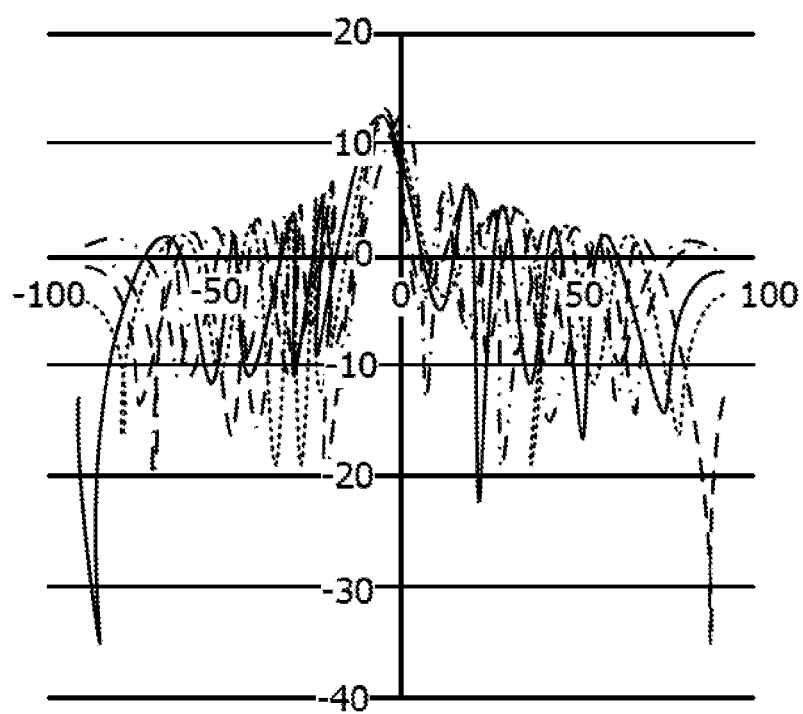
FIG. 21 is a directionality characteristic diagram of the array antenna when the power supply circuit is illustrated in FIG. 14 used.
Figure 22:
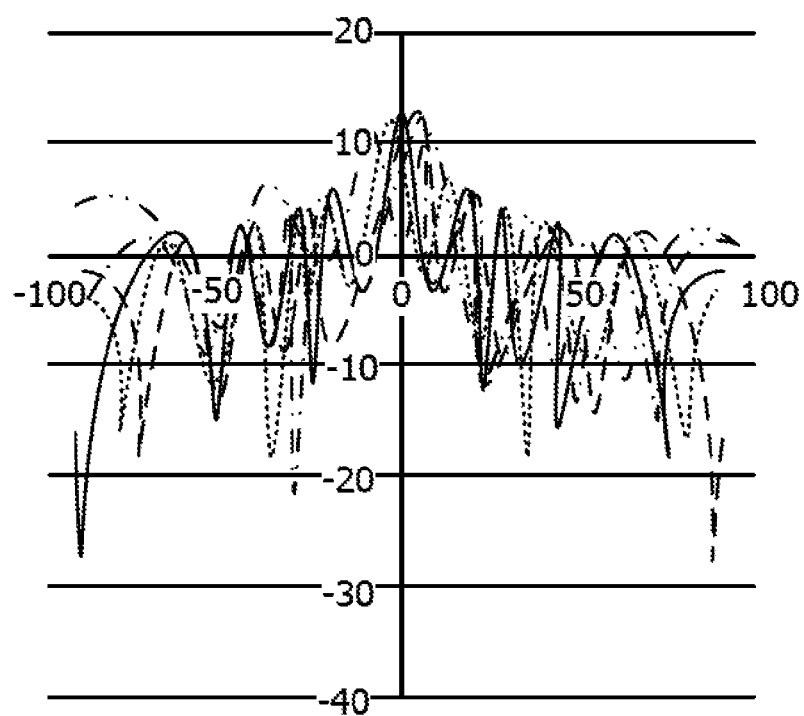
FIG. 22 is a directionality characteristic diagram of the array antenna when the power supply circuit is illustrated in FIG. 15 used.
Figure 23:
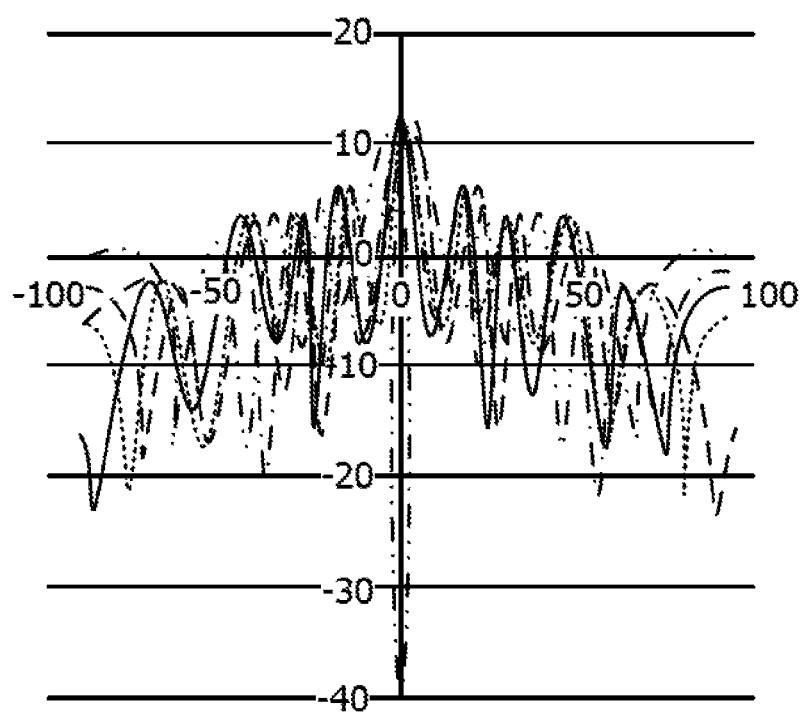
FIG. 23 is a directionality characteristic diagram of the array antenna when the power supply circuit is illustrated in FIG. 16 used.

FIGS. 21 to 23 are diagrams illustrating directionality characteristics of the array antenna 105 when power supply circuits having the configurations illustrated in FIGS. 14 to 16 were used, respectively. Each array antenna used in simulation is an array antenna in which nine antenna elements are arranged at an interval of 0.3 λ between adjacent antenna elements, where λ represents wavelength. Digital baseband signals were provided with a phase difference of 30° between the phases thereof from −180° to 180° through the phase adjusters 211, and converted into analog signals through the digital combiners 212 and 213 and the DACs 214 and 215. Then, radio signals having frequencies converted into radio frequencies through the upconverter 216 were inputted to the power supply circuit 217.

As illustrated in FIG. 21, when the power supply circuit 217 having the configuration illustrated in FIG. 14 was used, normalization was performed at the circuit at each stage, so that main beams had aligned intensities. As illustrated in FIG. 22, when the power supply circuit 217 having the configuration illustrated in FIG. 15, in which normalization is performed at the third stage circuit, was used, a result substantially same as that in FIG. 21 was obtained with slight fluctuations.

As illustrated in FIG. 23, when the power supply circuit 217 having the configuration illustrated in FIG. 16, in which no amplifier is provided, was used, main beams had different intensities depending on phase differences.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
   a plurality of phase adjusters configured to adjust the phase of a digital baseband signal $d^{(k)}$ for k=1, 2, . . . , K (K is a natural number equal to or larger than one) and output a plurality of digital signals $d_1^{(k)}$, $d_2^{(k)}$, . . . , $d_m^{(k)}$ (m is a natural number equal to or larger than two) having phases different from each other;
   an i-th converter configured to convert a signal obtained by synthesizing the digital signals $d_i^{(1)}$, $d_i^{(2)}$, . . . , $d_i^{(K)}$ into an analog signal $a_i$ for i=1, 2, . . . , m; and
   a power supply circuit including a first stage circuit, a second stage circuit, . . . , an N-th stage circuit (N is a natural number equal to or larger than two), wherein
   the first stage circuit outputs an analog signal having a phase same as the phase of the analog signal $a_1$, an analog signal having a phase same as the phase of an analog signal obtained by inputting the analog signal $a_{i-1}$ and the analog signal $a_i$ to a combiner for i=2, 3, . . . , m, and an analog signal having a phase same as the phase of the analog signal $a_m$,
   the (n+1)-th stage circuit outputs an analog signal having a phase same as the phase of an analog signal $a_1^{(n)}$, an analog signal having a phase same as the phase of an analog signal obtained by inputting an analog signal $a_{i-1}^{(n)}$ and an analog signal $a_i^{(n)}$ to a combiner for i=2, 3, . . . , m, and an analog signal having a phase same as the phase of an analog signal $a_M^{(n)}$, where analog signals outputted from the n-th stage circuit are represented by $a_1^{(n)}$, $a_2^{(n)}$, . . . , $a_M^{(n)}$ (M is a natural number equal to or larger than three), and
   the N-th stage circuits output analog signals to different antenna elements, respectively.

2. The wireless communication apparatus according to claim 1, wherein
   the first stage circuit outputs an analog signal having a phase same as the phase of the analog signal $a_i$ for i=2, 3, . . . , m−1, where m is a natural number equal to or larger than three, in addition to an analog signal having a phase same as the phase of an analog signal obtained by inputting the analog signal $a_{i-1}$ and the analog signal $a_i$ to a combiner, and
   the (n+1)-th stage circuit outputs an analog signal having a phase same as the phase of an analog signal $a_i^{(n)}$ for i=2, 3, . . . , M−1, where analog signals outputted from the n-th stage circuit are represented by $a_1^{(n)}$, $a_2^{(n)}$, . . . , $a_M^{(n)}$, in addition to an analog signal having a phase same as the phase of an analog signal obtained by inputting an analog signal $a_{i-1}^{(n)}$ and the analog signal $a_i^{(n)}$ to a combiner.

3. The wireless communication apparatus according to claim 1, wherein the N-th stage circuit includes a plurality of amplifiers, and output signals from the N-th stage circuit are inputted to different amplifiers and outputted to the different antenna elements.

4. The wireless communication apparatus according to claim 3, wherein output signals from the plurality of amplifiers are identical to each other.

5. The wireless communication apparatus according to claim 3, wherein the n-th stage circuit includes a plurality of amplifiers for n=1, 2, ..., N−1, where N is a natural number equal to or larger than two, and the n-th stage circuit inputs output analog signals to different amplifiers and outputs the analog signals to the (n+1)-th stage circuit.

6. The wireless communication apparatus according to claim 5, wherein output signals from the plurality of amplifiers included in the n-th stage circuit are identical to each other for n=1, 2, ..., N−1.

7. The wireless communication apparatus according to claim 1,
the wireless communication apparatus further comprising L (L is a natural number equal to or larger than one) combiners to which the analog signals $a_1$ and $a_2$ are inputted, wherein an amplifier is disposed upstream of each of the combiners to which the analog signals $a_1$ and $a_2$ are inputted.

8. The wireless communication apparatus according to claim 1, further comprising a switch for one input and p+1 outputs upstream of each of the antenna elements, wherein each switch is further connected with p antenna elements.

9. An antenna directionality control method comprising:
adjusting the phase of a digital baseband signal $d^{(k)}$ for k=1, 2, ..., K (K is a natural number equal to or larger than one);
outputting a plurality of digital signals $d_1^{(k)}, d_2^{(k)}, \ldots, d_m^{(k)}$ (m is a natural number equal to or larger than two) having phases different from each other;
converting a signal obtained by synthesizing the digital signals $d_i^{(1)}, d_i^{(2)}, \ldots, d_i^{(K)}$ into an analog signal $a_i$ for i=1, 2, ..., m; and
including a first stage circuit, a second stage circuit, ..., an N-th stage circuit (N is a natural number equal to or larger than two), wherein the first stage circuit outputs an analog signal having a phase same as the phase of the analog signal $a_1$, an analog signal having a phase same as the phase of an analog signal obtained by inputting the analog signal $a_{i-1}$ and the analog signal $a_i$ to a combiner for i=2, 3, ..., m, and an analog signal having a phase same as the phase of the analog signal $a_m$,
the (n+1)-th stage circuit outputs an analog signal having a phase same as the phase of an analog signal $a_1^{(n)}$, an analog signal having a phase same as the phase of an analog signal obtained by inputting an analog signal $a_{i-1}^{(n)}$ and an analog signal $a_i^{(n)}$ to a combiner for i=2, 3, ..., m, and an analog signal having a phase same as the phase of an analog signal $a_M^{(n)}$, where analog signals outputted from the n-th stage circuit are represented by $a_1^{(n)}, a_2^{(n)}, a_M^{(n)}$ (M is a natural number equal to or larger than three), and
the N-th stage circuits output analog signals to different antenna elements, respectively.

10. A power supply circuit comprising:
a first stage circuit outputting an analog signal having a phase same as the phase of the analog signal $a_1$, an analog signal having a phase same as the phase of an analog signal obtained by inputting the analog signal $a_{i-1}$ and the analog signal $a_i$ to a combiner for i=2, 3, ..., m, and an analog signal having a phase same as the phase of the analog signal $a_m$;
a (n+1)-th stage circuit outputting an analog signal having a phase same as the phase of an analog signal $a_1^{(n)}$, an analog signal having a phase same as the phase of an analog signal obtained by inputting an analog signal $a_{i-1}^{(n)}$ and an analog signal $a_i^{(n)}$ to a combiner for i=2, 3, ..., m, and an analog signal having a phase same as the phase of an analog signal $a_M^{(n)}$, where analog signals outputted from the n-th stage circuit are represented by $a_1^{(n)}, a_2^{(n)}, \ldots, a_M^{(n)}$ (M is a natural number equal to or larger than three); and
N-th stage circuits outputting analog signals to different antenna elements, respectively (N is a natural number equal to or larger than two).

* * * * *